(12) United States Patent
Kuo et al.

(10) Patent No.: US 8,755,699 B2
(45) Date of Patent: *Jun. 17, 2014

(54) NOISE REDUCTION IN TONER PRINTS

(75) Inventors: Chung-Hui Kuo, Fairport, NY (US); Dinesh Tyagi, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/562,409

(22) Filed: Jul. 31, 2012

(65) Prior Publication Data

US 2014/0037306 A1    Feb. 6, 2014

(51) Int. Cl.
G03G 15/01    (2006.01)
(52) U.S. Cl.
USPC ............................................. 399/39; 399/38
(58) Field of Classification Search
USPC ........................................................ 399/39
See application file for complete search history.

(56) References Cited

U.S. PATENT DOCUMENTS

| | | | |
|---|---|---|---|
| 3,694,359 A | 9/1972 | Merrill et al. |
| 3,713,861 A | 1/1973 | Sharp |
| 3,893,935 A | 7/1975 | Jadwin et al. |
| 4,079,014 A | 3/1978 | Burness et al. |
| 4,089,472 A | 5/1978 | Siegel et al. |
| 4,160,644 A | 7/1979 | Ryan |
| 4,323,634 A | 4/1982 | Jadwin |
| 4,338,390 A | 7/1982 | Lu |
| RE31,072 E | 11/1982 | Jadwin et al. |
| 4,394,430 A | 7/1983 | Jadwin et al. |
| 4,414,152 A | 11/1983 | Santilli et al. |
| 4,416,965 A | 11/1983 | Sandhu et al. |
| 4,430,408 A | 2/1984 | Sitaramiah |
| 4,624,907 A | 11/1986 | Niimura et al. |
| 4,780,553 A | 10/1988 | Suzuki et al. |
| 4,814,250 A | 3/1989 | Kwarta et al. |
| 4,834,920 A | 5/1989 | Bugner et al. |
| 4,840,864 A | 6/1989 | Bugner et al. |
| 5,105,451 A | 4/1992 | Lubinsky et al. |
| 5,120,631 A | 6/1992 | Kanbayashi et al. |
| 5,298,356 A | 3/1994 | Tyagi et al. |
| 5,714,295 A | 2/1998 | Wilson et al. |
| 6,664,017 B1 | 12/2003 | Patel et al. |
| 2010/0164218 A1 | 7/2010 | Schulze-Hagenest et al. |
| 2011/0262654 A1 | 10/2011 | Yates et al. |
| 2011/0262858 A1 | 10/2011 | Nair et al. |

OTHER PUBLICATIONS

13562416, Claims, Whole Document.*
1991 Handbook of Imaging Materials, 2$^{nd}$ Edition, Marcel Dekker, Inc., New York, ISBN 0-8247-8451-0, Chapter 4, Dry Toner Technology, Robert J. Gruber and Paul C. Julien, 4.3.4. Charging, p. 180.
IS & T NIP 20: International Conference on Digital Printing Technologies, IS&T: The Society for Imaging Science and Technology, Salt Lake City, UT, Oct. 2004, ISBN 089208-253-4, Enabling Expanded Color Gamut and In-line Coating Processes, Dinesh Tyagi et al., pp. 135-138.
Measuring Color, 2$^{nd}$ Edition, R.W.G. Hunt, Section 1.9, Relative Perceptual Attributes of Colour, p. 32.

* cited by examiner

*Primary Examiner* — Clayton E Laballe
*Assistant Examiner* — Jas Sanghera
(74) *Attorney, Agent, or Firm* — Roland R. Schindler; Kevin E. Spoulding

(57) ABSTRACT

Methods for determining toner color images are provided in which fluorescent toner is used create light in a fused toner mass that reduces the appearance of noise in a noise evident portion of the fused toner mass.

15 Claims, 10 Drawing Sheets

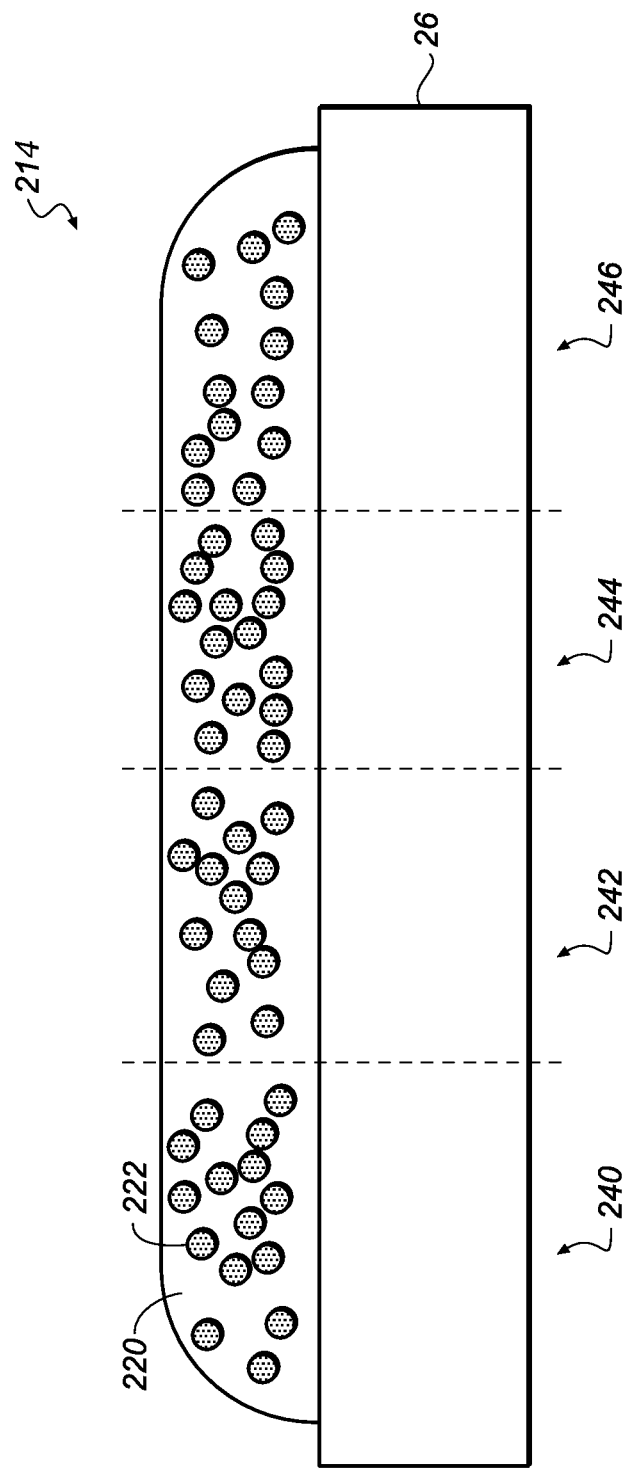

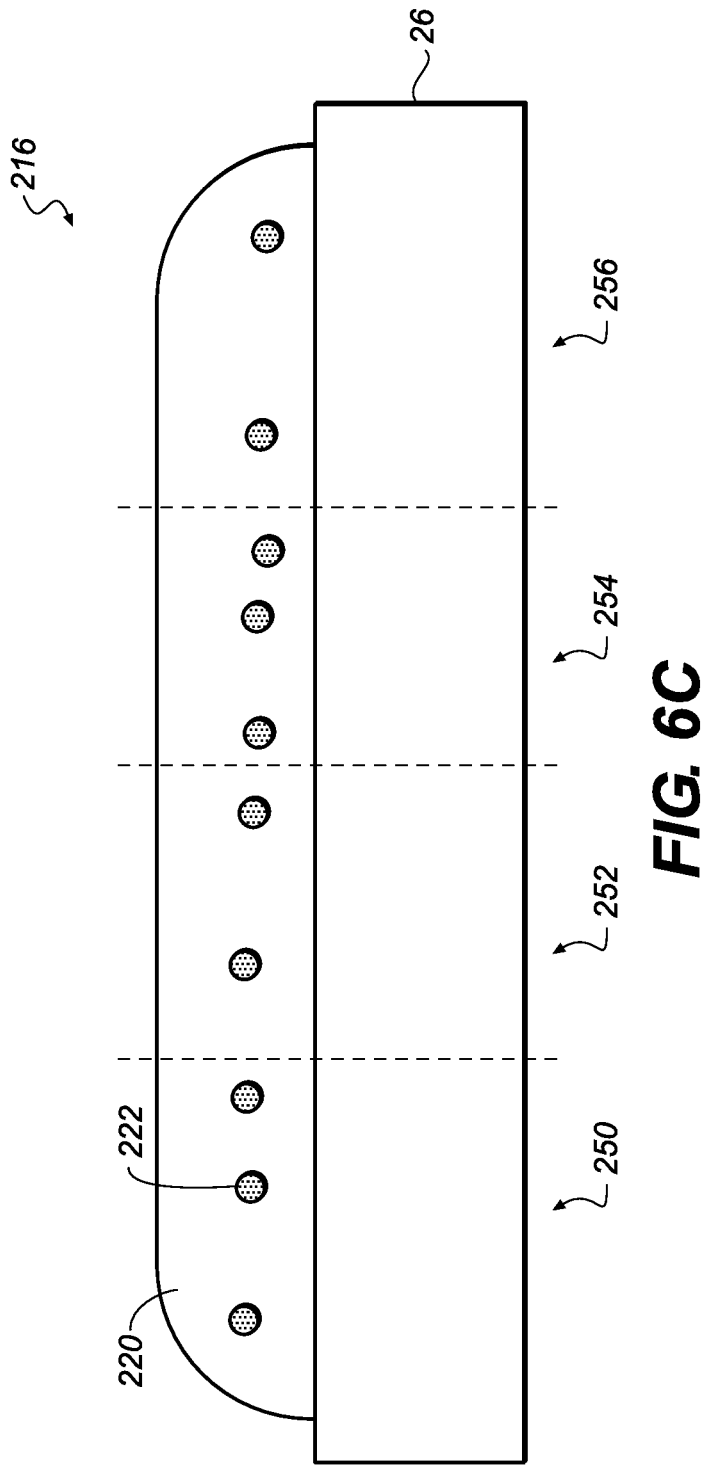

NOISE REDUCTION IN TONER PRINTS

CROSS REFERENCE TO RELATED APPLICATIONS

This application relates to commonly assigned, copending U.S. application Ser. No. 13/562,416, filed Jul. 31, 2012, entitled: "PRINTING SYSTEM WITH NOISE REDUCTION" which is hereby incorporated by reference.

FIELD OF THE INVENTION

The invention relates to electrophotographic and other electrostatographic printing methods and systems and more particularly relates to electrostatographic methods and systems using toner-based noise reduction.

BACKGROUND OF THE INVENTION

In digital printing, image data representing a pattern of colors to be printed is converted into a pattern of colorants that are applied to a receiver to form a printed image. Ideally, the image data is free of noise and the printed image has a pattern of colorants with the same colors as the pattern of colors from the image data. However, no printing system is ideal and printed images occasionally have areas with colors that deviate from the pattern of colors called for in the image data. In some cases, these deviations are intentional. In other cases, these deviations are unintentional. The latter deviations are known as noise.

Noise can be introduced during any of a number of printing and prepress activities and many common printing processes such as plate making, screening, color separation, half-tone processing have a potential to introduce some level of noise in a print. For example, in electrostatographic systems, some of the noise is associated with the use of toner, which is typically provided in a dry particulate form, then patterned, transferred to a receiver and fused to the receiver to form the print. In such electrostatographic systems, it has been known that curves of granularity number vs. screen resolution (lines per inch, "lpi") are different with different toner particle sizes and with a uniform nominal toner particle size and different toner particle size distributions.

Noise can also exist in the image data provided for printing. This noise can arise at any stage in the process in which image data is generated for printing. For example such noise can arise during image capture, mastering, editing or compression.

Noise reduction algorithms and other techniques can be applied uniformly to all images, but this approach is inefficient, since some of the images may not benefit from noise reduction. In addition to allowing greater efficiency, variable noise reduction can produce better results. The application of a noise filter on an image often has an unintended consequence of reducing desirable image detail. Methods for designing and using Sigma filters are disclosed in U.S. Pat. No. 6,907,144 that attempt to minimize the loss of image detail while reducing the random noise present in a digital image. U.S. Pat. No. 5,923,775 (Snyder et al.) discloses varying noise reduction based on characteristics of an image. U.S. Pat. No. 6,934,421 (Gindele et al.) discloses varying noise reduction in accordance with the characteristics of a particular input source. U.S. Pat. No. 6,931,160 teaches use of a noise table in noise reduction. U.S. Pat. No. 7,065,255 (Chen et al.) discloses method and apparatus, in which noise in digital images is reduced using a noise table that is selected based on metadata associated with the respective images.

These efforts notwithstanding, noise continues to be evident in printed images and there remains an ongoing desire for additional methods and systems that can be used to further reduce noise.

SUMMARY OF THE INVENTION

Methods for determining toner color images are provided. In one method image data and printing instructions for printing the image data are obtained, and a target colors is determined based upon the image data and the printing instructions and a color gamut that can be formed using a predetermined combination of reflective toner colors. A plurality of reflective toner color images is generated for combination in register to form the pattern of target colors and at least one noise evident portion in the pattern of target colors where any unintended density variations will create visual artifacts in the print. A fluorescent toner color image is generated that when printed using a corresponding fluorescent toner will generate a diffuse fluorescent color light that reduces the extent to which noise induced variations in density in the noise evident portion are observable. The plurality of reflective toner images is adjusted so that the reflective toner color images combine with the fluorescent color image to form the target color image.

BRIEF DESCRIPTION OF THE DRAWINGS

FIG. 6B is a sectional view of a second fused toner print on a patch of receiver having a density in the high range reflective toner densities and noise.

FIG. 6C is a sectional view of a third fused toner print on a patch of receiver having a density in the low range of reflective toner densities and noise.

DETAILED DESCRIPTION OF THE INVENTION

Figure 1:
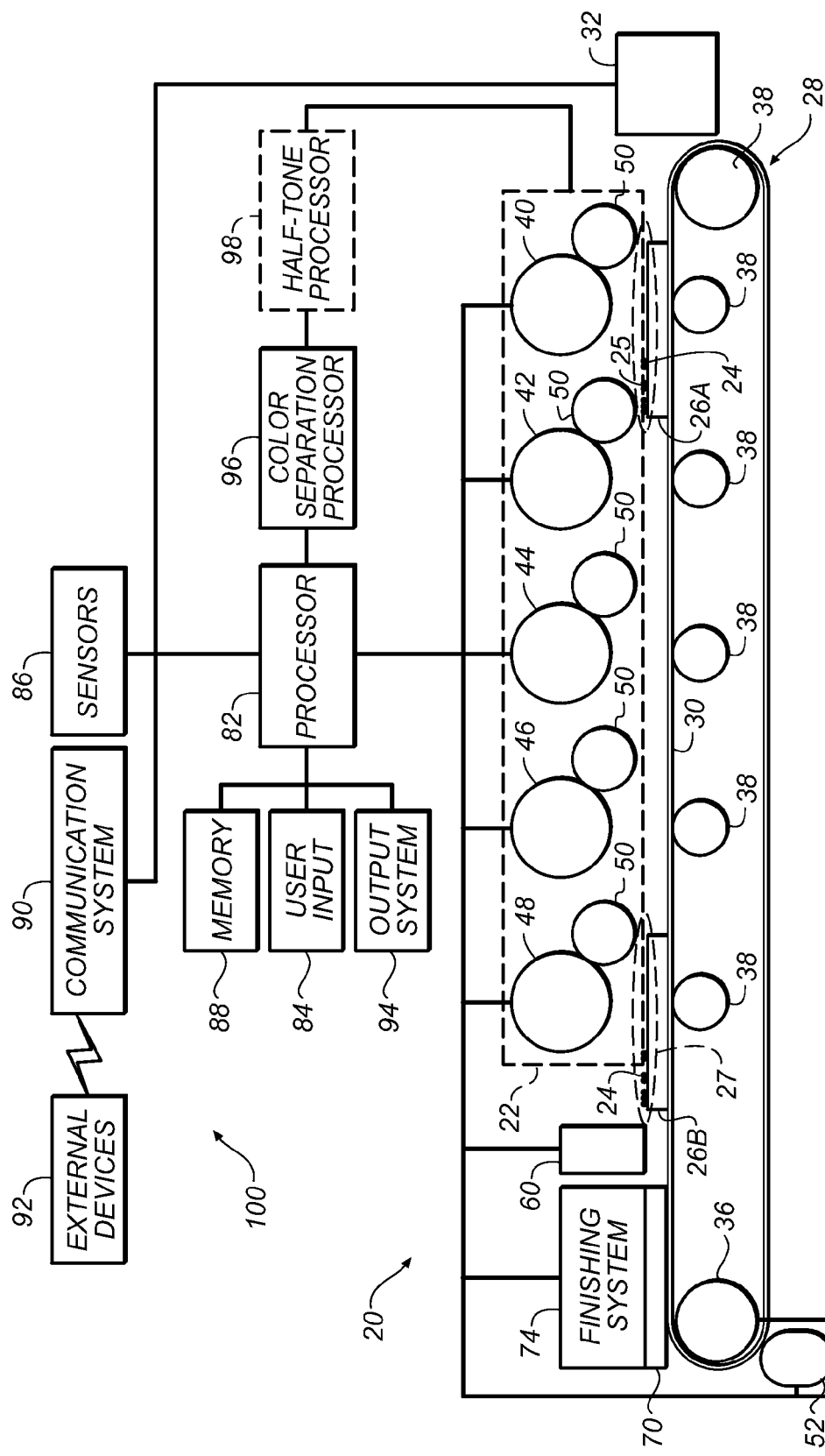
FIG. 1 illustrates a first embodiment of a toner printer.

FIG. 1 is a system level illustration of one embodiment of a toner printer 20. In the embodiment of FIG. 1, toner printer 20 has a print engine 22 that deposits toner 24 to form a toner image 25 in the form of a patterned arrangement of toner stacks. Toner image 25 can include any pattern of toner 24 and can be mapped according to image data representing text, graphics, photo, and other types of visual content, as well as patterns that are determined based upon desirable structural or functional arrangements of the toner 24.

Toner 24 is a material or mixture that contains toner particles and that can develop on an imaging member having an electrostatic latent image. Examples of such an imaging member include a photoreceptor, photoconductor, or electrostatically charged surface. Particles of toner 24 have at least two components, a generally transparent binder material and colorant particles that cause the toner particles to have a particular color.

Typically, toner 24 has reflective colorant particles disbursed within the toner binder material. The reflective colorant particles absorb and reflect selected wavelengths of an ambient light to cause light that is reflected by the colorant particles to have a reflective toner color. These particles are generally referred to herein as reflective toner particles.

Toner 24 can also include so called fluorescent toner particles that have a binder material with fluorescent colorant particles therein. Fluorescent colorant particles absorb and can reflect visible light as do reflective toner particles. Fluorescent colorant particles also absorb invisible wavelengths of light such as infra-red and ultra-violet light and convert this absorbed light into a light that is emitted from the fluorescent colorant particles. This allows such fluorescent colorant particles to appear to provide greater brightness than reflective toner colors having a comparable color hue angle. Examples of such fluorescent colorant particles will be described in greater detail below.

Additionally, it is known to provide particles of toner 24 with little or no colorant therein. When fused, such clear particles have the appearance of being transparent or that while being generally transparent impart a coloration or opacity. Such clear toner particles can provide for example, a protective layer on an image or can be used to create other effects and properties on the image.

Toner particles can have a range of diameters, e.g. less than 4 µm, on the order of 5-15 µm, up to approximately 30 µm, or larger. When referring to particles of toner 24, the toner size or diameter is defined in terms of the mean volume weighted diameter as measured by conventional diameter measuring devices such as a Coulter Multisizer, sold by Coulter, Inc. The mean volume weighted diameter is the sum of the volume of each toner particle multiplied by the diameter of a spherical particle of equal volume, divided by the total particle volume. Toner 24 is also referred to in the art as marking particles or dry ink. In certain embodiments, toner 24 can also comprise particles that are entrained in a liquid carrier.

Typically, receiver 26 takes the form of paper, film, fabric, metalized or metallic sheets or webs. However, receiver 26 can take any number of forms and can comprise, in general, any article or structure that can be moved relative to print engine 22 and processed as described herein.

Print engine 22 has one or more printing modules, shown in FIG. 1 as printing modules 40, 42, 44, 46, and 48 that are each used to deliver a single application of toner 24 to form a toner image 25 on receiver 26. For example, the toner image 25 shown formed on receiver 26A shown in FIG. 1 can provide a monochrome image or layer of a structure or other functional material or shape.

Print engine 22 and a receiver transport system 28 cooperate to cause one or more toner image 25 to be provided in registration to form a composite toner image 27 such as the composite image 27 shown in FIG. 1 as being formed on receiver 26B. Composite toner image 27 can be used for any of a plurality of purposes, the most common of which is to provide a printed image with more than one color. For example, in a four color image, four toner images are formed with each toner image having one of the four subtractive primary colors, cyan, magenta, yellow, and black. These four toner colors can be combined to form a representative color gamut. Similarly, in a five color image various combinations of any of five differently colored toners can be combined to form a color print on receiver 26. That is, any of the five colors of toner 24 can be combined with toner 24 of one or more of the other colors at a particular location on receiver 26 to form a color after a fusing or fixing process that is different than the colors of the toners 24 applied at that location.

In FIG. 1, print engine 22 is illustrated with five printing modules 40, 42, 44, 46 and 48 arranged along a length of receiver transport system 28. Each printing module delivers a single toner image 25 to a respective transfer subsystem 50 in accordance with a desired pattern. The respective transfer subsystem 50 transfers the toner image 25 onto a receiver 26 as receiver 26 is moved by receiver transport system 28 past transport system 50. Receiver transport system 28 comprises a movable surface 30 that positions receiver 26 relative to printing modules 40, 42, 44, 46, and 48. In this embodiment, movable surface 30 is illustrated in the form of an endless belt that is moved by motor 36, that is supported by rollers 38, and that is cleaned by a cleaning mechanism 52. However, in other embodiments receiver transport system 28 can take other forms and can be provided in segments that operate in different ways or that use different structures. In an alternate embodiment, not shown, printing modules 40, 42, 44, 46 and 48 can each deliver a single application of toner 24 to a common transfer subsystem 50 to form a combination toner image 27 thereon which can be transferred to a receiver 26. As is also shown in FIG. 1, a cleaning system 52 can be provided to clean movable surface 30.

Print engine 22 can cause a single toner 24 to be transferred to a receiver 26 to form a toner image 25 as receiver 26 is moved by receiver transport system 28 relative to print engine 22. Where more than one toner image 25 is transferred onto a receiver 26 in registration, a composite toner image 27 is formed. In such a composite toner image 27, different types of toner are combined at individual areas of a receiver 26. The toner colors transferred to receiver 26 are combined during fusing to form a single combination color at each location of a receiver to provide different combinations of properties, or for other purposes. For example, in a four color image, four toners having subtractive primary colors, cyan, magenta, yellow, and black, can be combined to form any of a plurality of combination colors in a four-color color gamut. Similarly, in a five color image various combinations of any of five toner colors can be combined at individual locations on receiver 26 to form any of a plurality of combination colors in a five-color color gamut.

Typically, the addition of the fifth toner is used to increase the color gamut available for printing as compared to a color gamut available using four toners for printing. However, the fifth toner can also be a specialty color toner or spot color, such as for making proprietary logos or colors that cannot be produced repeatedly or accurately with only reflective type colorants used for example to provide cyan, magenta, yellow and black toner colors. Other toners such as those that provide metallic or pearlescent colors, or a clear toner or tinted toner can also be supplied by way of a fifth printing module. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

The fifth color can also include a fluorescent toner color that can be used as described herein to reduce noise levels in a toner print.

As is also shown in the embodiment of FIG. 1, toner printer 20 includes a fuser 60. Fuser 60 can take any variety of forms and can include, for example, a heated fusing roller and opposing pressure roller, a noncontact fusing system, a solvent based fusing system. In other embodiments, other known systems for causing a toner image to adhere to a receiver can be used as is known in the art. In the example illustrated in FIG. 1, receiver transport system 28 advances a receiver such as receiver 26B past fuser 60 after a composite toner image 27 has been formed thereon. This yields a toner print 70. Receiver transport system 28 then advances receiver 26B to an optional finishing system 74 that can perform any of a wide variety of finishing operations on toner print 70. It will be understood that fuser 60 can be used to bond a toner image or a composite image 27 to a receiver 26 in ways other Printer 20 is operated by a printer processor 82 that controls the operation of print engine 22, receiver transport system 28, receiver delivery system 32, and transfer system 50, to form, for example, a composite toner image 27 on receiver 26 and to cause fuser 60 composite toner image 27 to receiver 26 to form prints 70 as described herein or as is otherwise known in the art.

Printer processor 82 can take any of a variety of forms and can comprise for example, and without limitation a mainframe, server, or personal computer, a digital microprocessor, logic control device, programmable logic controller, a programmable analog device, or a hardwired arrangement of circuits and/or circuit components that can perform the functions described herein.

Printer processor 82 operates printer 20 based upon input signals from a user input system 84, sensors 86, a memory 88 and a communication system 90. User input system 84 can comprise any form of transducer or other device capable of detecting conditions that are indicative of an action of a user and converting this input into a form that can be used by printer processor 82. For example, user input system 84 can comprise a touch screen input, a touch pad input, a 4-way switch, a 6-way switch, an 8-way switch, a stylus system, a trackball system, a joystick system, a voice recognition system, a gesture recognition system or other such systems. Sensors 86 can include contact, proximity, magnetic, or optical sensors and other sensors known in the art that can be used to detect conditions in printer 20 or in the environment surrounding printer 20 and to convert this information into a form that can be used by printer processor 82 in governing printing, fusing, finishing or other functions. Memory 88 can comprise any form of conventionally known memory devices including but not limited to optical, magnetic or other movable media as well as semiconductor or other forms of electronic memory. Memory 88 can be fixed within printer 20 or removable from printer 20 at a port, memory card slot or other known means for temporarily connecting a memory 88 to an electronic device. Memory 88 can also be connected to printer 20 by way of a fixed data path or by way of communication system 90.

Communication system 90 can comprise any form of circuit, system or transducer that can be used to send signals to or receive signals from memory 88 or external devices 92 that are separate from or separable from direct connection with printer processor 82. Communication system 90 can connect to external devices 92 by way of a wired or wireless connection. In certain embodiments, communication system 90 can comprise any circuit that can communicate with one of external devices 92 using a wired connection such as a local area network, a point-to-point connection, or an Ethernet connection. In certain embodiments, communication system 90 can alternatively or in combination provide wireless communication circuits for communication with separate or separable devices using, for example, wireless telecommunication or wireless protocols such as those found in the Institute of Electronics and Electrical Engineers Standard 802.11 or any other known wireless communication systems. Such systems can be networked or can use point to point communication.

External devices 92 can comprise any type of electronic system that can generate signals bearing data that may be useful to printer processor 82 in operating printer 20. For example and without limitation, one example of such external devices 92 can include but are not limited to mainframe and personal computers, portable computing devices, digital graphic processing systems, and any form of general-purpose or special-purpose digital computing device that can perform the functions described herein. In one embodiment an external device can be what is known in the art as a digital front end (DFE), which is a computing device that can be used to provide an external source of a print order that has image information and, optionally, printing instructions including printing information from which the manner in which the images are to be printed can be determined. Optionally, the printing instructions can include finishing information that defines how prints made according to the print order are to be processed after printing. A print order that is generated by such external devices 92 is received at communication system 90 which in turn provides appropriate signals that are received by communication system 90.

Similarly, the print order or portions thereof including image and production data can be obtained from any other source that can provide such data to printer 20 in any other manner, including but not limited to memory 88. Further, in certain embodiments image data and/or production data or certain aspects thereof can be generated from a source at printer 20 such as by way of user input system 84 and an output system 94. Output system 94 can comprise for example and without limitation a display, audio signal source or tactile signal generator or any other device that can be used by printer processor 82 to provide human perceptible signals for feedback, informational or other purposes.

Printer 20 further comprises an output system 94, such as a display, audio signal source or tactile signal generator or any other device that can be used to provide human perceptible signals by printer processor 82 to feedback, informational or other purposes.

Printer 20 prints images based upon print order information. Print order information can include image data and printing instructions that enable printer processor 82 to make a print.

The print order information can be supplied by a variety of sources. In the embodiment of FIG. 1, these sources include memory 88, communication system 90, that printer 20 can receive such image data through local generation or processing that can be executed at printer 20 using, for example, user input system 84, output system 94 and printer processor 82. Print order information can also be generated by way of remote input 56 and local input 66 and can be calculated by printer processor 82. For convenience, these sources are referred to collectively herein as source of print order information 100. It will be appreciated, that this is not limiting and that source of print order information 100 can comprise any electronic, magnetic, optical or other system known in the art of printing that can be incorporated into printer 20 or that can cooperate with printer 20 to make print order information or parts thereof available.

In the embodiment of printer 20 that is illustrated in FIG. 1, printer processor 82 has a color separation image processor 96 to convert the image data into color separation image data that can be used by printing modules 40-48 of print engine 22 to generate color separation images. An optional half-tone processor 98 is also shown that can process the color separation images according to any half-tone screening requirements of print engine 22. In other embodiments, printer processor 82 can be used to perform the functions of generating color separation images. In still other embodiments, external devices such as external computers and DFEs can be used to generate color separation images. Conventional color separation techniques can be used for this purpose including raster image processing.

Figure 2:
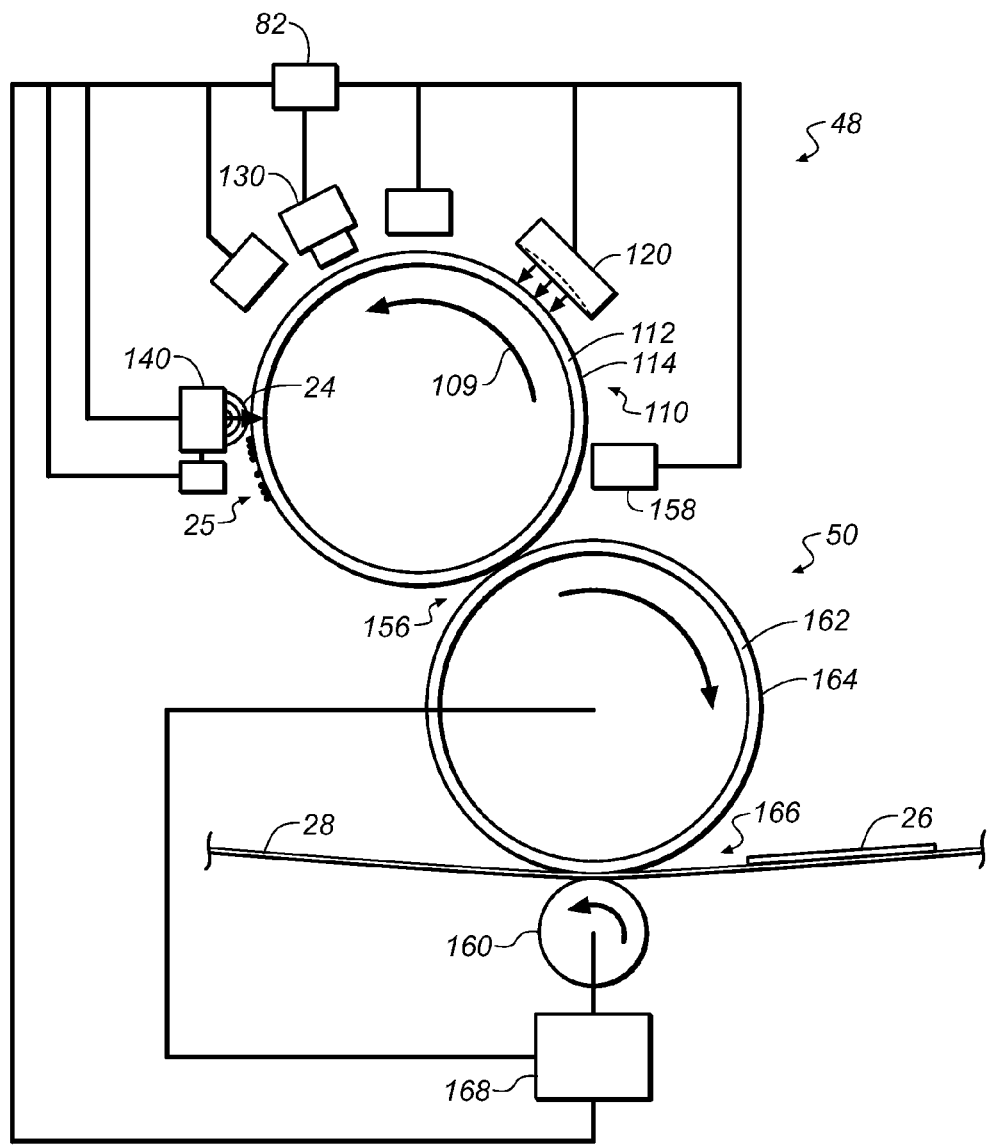
FIGS. 2, 3, and 4 illustrate the operation of one embodiment of a printing module.
Figure 3:
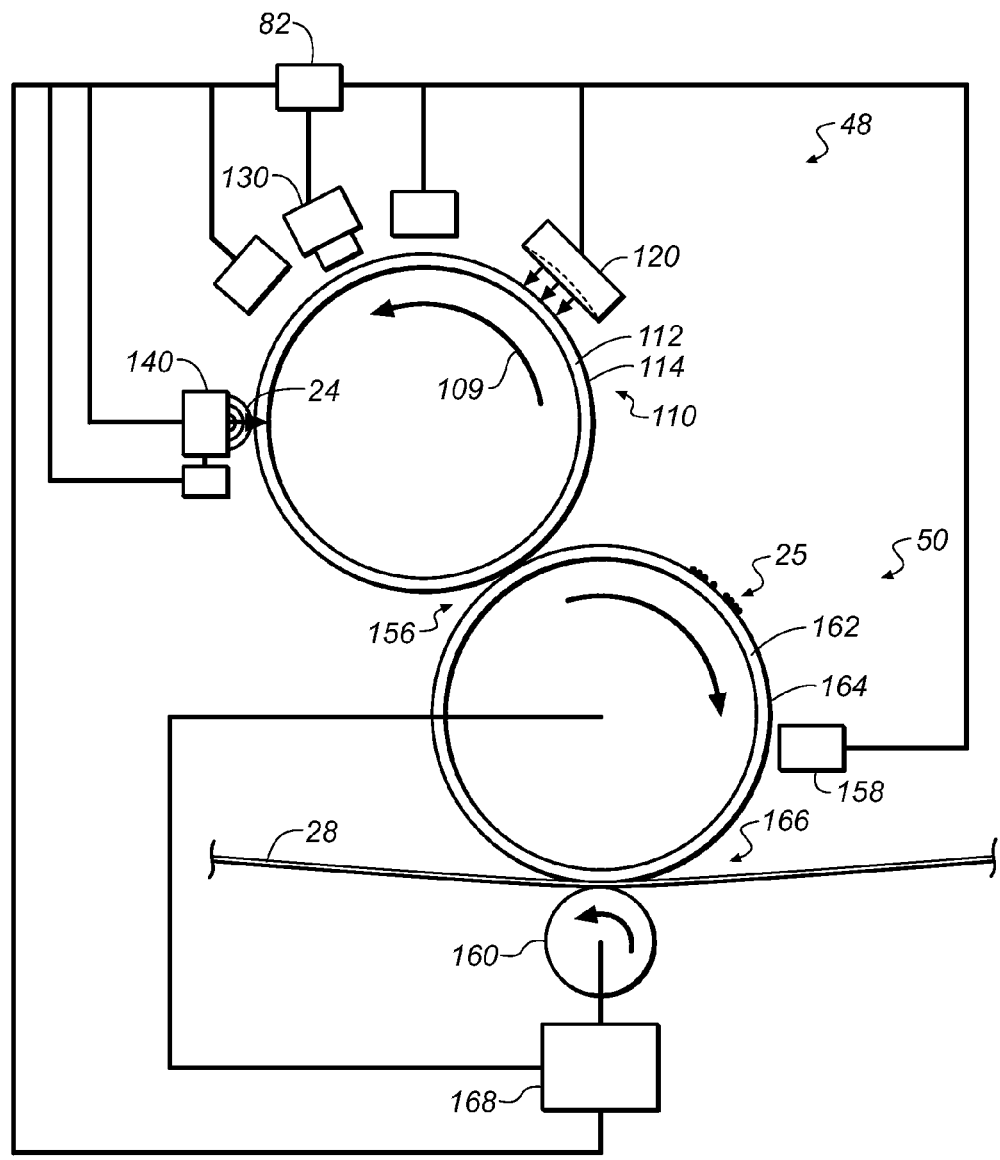
Figure 4:
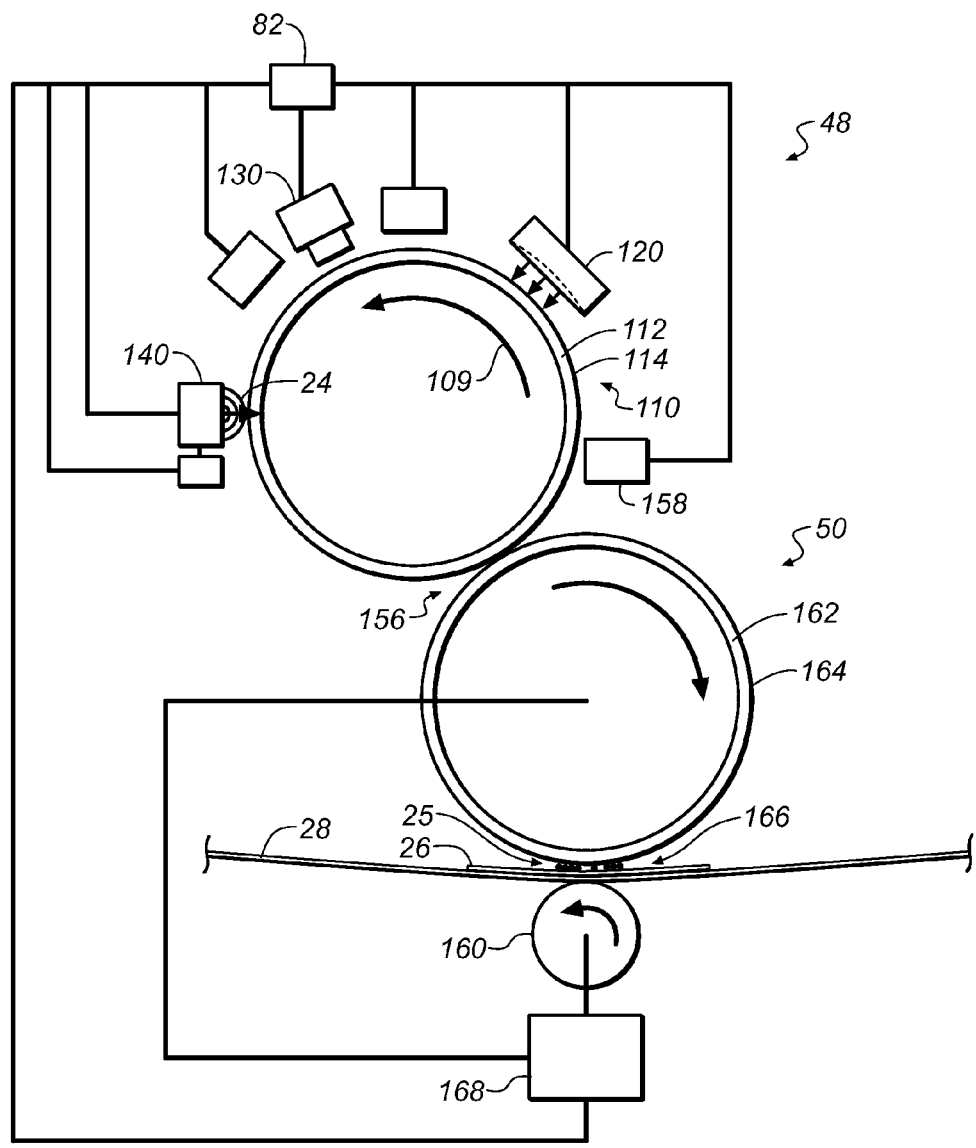

FIGS. 2, 3 and 4 illustrate a first embodiment of a printing module 48 that is representative of printing modules 40, 42, 44 and 46 of FIG. 1. In this embodiment, printing module 48 has a primary imaging system 110, a charging subsystem 120, a writing system 130 and a development system 140 that are each ultimately responsive to printer processor 82.

Primary imaging system 110 includes a primary imaging member 112. In the embodiment of FIGS. 2, 3 and 4, primary imaging member 112 takes the form of an imaging cylinder. However, in other embodiments primary imaging member 112 can take other forms, such as a belt or plate.

Primary imaging system 110 has a surface 114 on which a pattern of charge can be formed. In the embodiment of FIGS. 2, 3, and 4, surface 114 is a photoreceptor having a charge retentive surface on which a pattern of charge can be applied and further having a photosensitive layer that can locally discharge a charge on the surface as a function to an amount of light to which the charge retentive surface is exposed.

As is indicated by arrow 109 in FIGS. 2, 3 and 4, primary imaging member 112 is rotated by a motor (not shown) such that primary imaging member 112 rotates from charging subsystem 120 where a uniform charge is imparted onto primary imaging member 112, to writing subsystem 130 which selectively discharges primary imaging member 112 to for a latent electrostatic image on primary imaging member 112. Primary imaging member 112 is then rotated past first development station 140 where a charged toner 24 is exposed to the latent electrostatic image in the presence of a development field causing charged toner 24 to leave development station 140 and develop on the primary imaging member 112 to form a toner image corresponding to the latent electrostatic image.

Continued rotation of primary imaging member 112 brings the toner image into a transfer nip 156 with a transfer system 50 where the toner image is transferred to a co-rotating intermediate transfer member 162 and while further rotation of primary imaging member 112 moves primary imaging member 112 past a cleaning subsystem 158 and back to charging subsystem 120.

As is shown in FIG. 3, rotation of intermediate transfer member 162 causes surface 164 to move the transferred toner image 25 toward a transfer nip 166 while moving surface 30 advances receiver 26 toward transfer nip 166.

Figure 5:
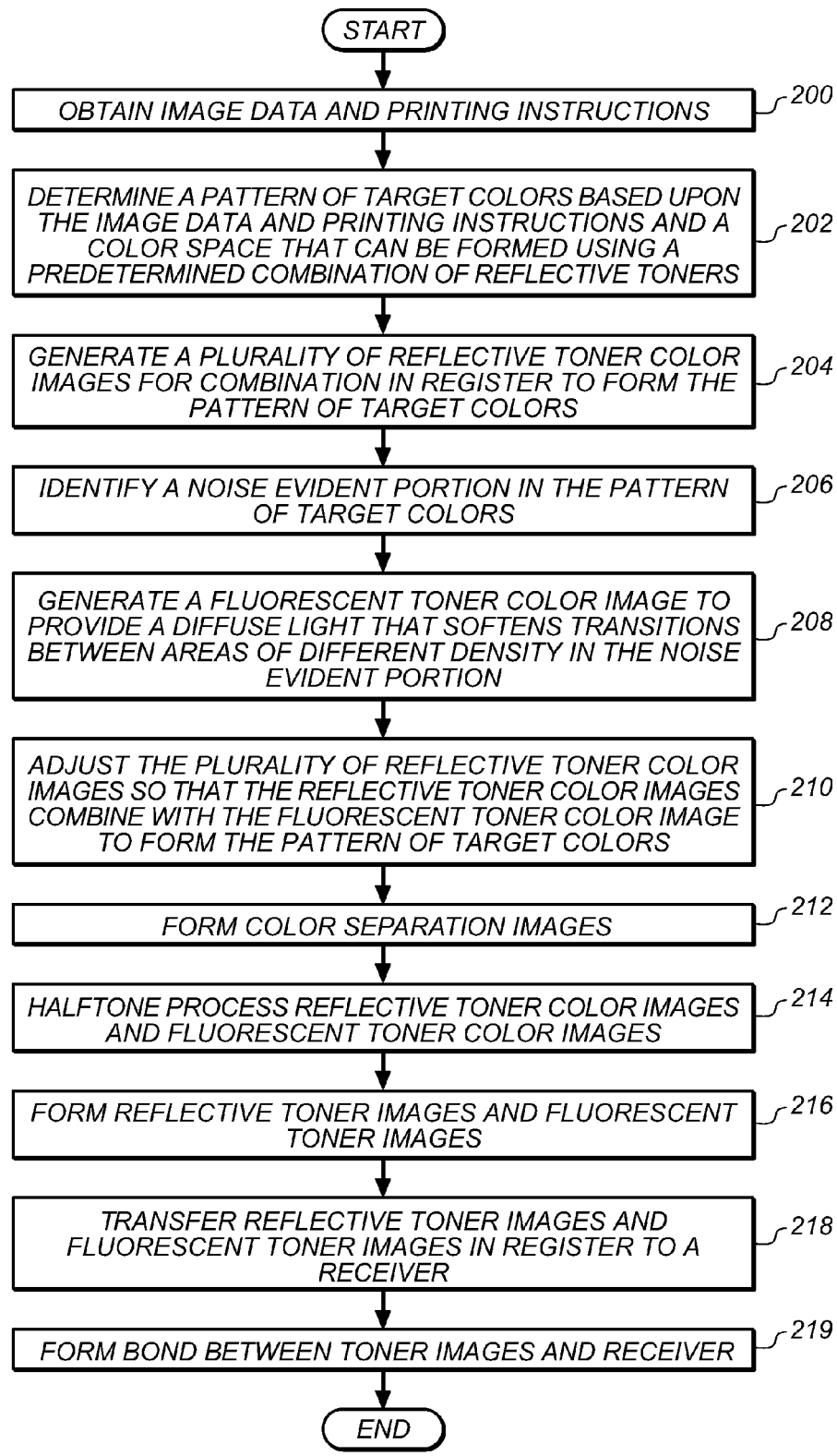
FIG. 5 illustrates a first embodiment of a method for determining toner color images.

As is shown in FIG. 5, when both toner image 25 and receiver 26 are in nip 166, print image 25 is transferred from transfer surface 164 of intermediate transfer member 162.

In this embodiment, transfer system 50 includes transfer backup member 160 opposite intermediate transfer member 162 at transfer nip 166. Intermediate transfer member 162 optionally has a resilient support (not shown) for transfer surface 164. As is further shown in the embodiments of FIGS. 2, 3 and 4 a transfer power supply 168 is provided to create a transfer field between intermediate transfer member 162 and transfer backup member 160 to facilitate the transfer of print image 25 onto receiver 26.

Method for Providing a Toner Print with Reduced Observable Noise

FIG. 5 illustrates one embodiment of a method for providing toner color images that can be executed for example by printer processor 82 of the embodiment of toner printer 20 of FIG. 1. However, it will be understood that this method can be executed in whole or in part by any or all of printer processor 82, by color separation processor 96 or by external devices 92 including but not limited to the Digital Front End (DFE) acting alone or in any functional combination thereof and that any or all of these can function as a system for performing any embodiment of the methods described herein.

In the embodiment of FIG. 5, image data and printing instructions for printing according to the image data are obtained (step 200). There are a variety of ways that this can be done. In one embodiment, print order data is provided by for example, the source of print order data 96 from an external device 92 by way of communication system 90. In this embodiment, printer processor 82 uses the print order data to determine the image data to be used in making the print and any printing instructions that define how print image data is to be used to form the print. The image data can include any form of data that can be used to generate an image. In this regard, the image data can include image data in the form of conventional types of image data files such as JPEG, TIFF, bitmap or graphics interchange format (GIF) data files. The image data can also be of a type that is obtained for example, from a color document scanner or that is generated by a digital camera or by a computer or from a memory or network. The image data can also be supplied in any other form that can be used by printer processor 82 to generate image data including algorithms and the like The printing instructions can comprise any information that can be used by printer processor 82 to determine any information regarding the way in which the image data is to be printed by printer 20. Examples of information that can be obtained from the printing instructions include but are not limited to information that can be used to determine a type of receiver to be used in making a print based upon the image data, a size and orientation of a print that is to be made using the image data, data from which a desired gloss level of the print can be determined, data from which finishing instructions for the print can be determined and any other information that may be useful to printer 20 in any way when generating a print based upon the determined image data.

Printer controller 82 then determines a pattern of target colors to be printed based upon the image data, printing instructions and a known color gamut that can be printed using a set of reflective toner colors (step 202). In one embodiment, printer controller 82 begins by identifying a pattern of target colors represented by the image data and then determining whether the pattern of target colors is be adjusted based upon the printing instructions. That is, to the extent that the printing instructions provide instructions that require modification of the target colors that are determined according to the image data or that that provide instructions that override the image data appropriate target colors will be determined that reflect the printing instructions and the image data. For example, the printing instructions can include instructions to superimpose text, graphics, or images onto the image data. In such an embodiment, the target colors determined for locations of the print where such text or graphics are to be superimposed are modified or superseded according to the printing instructions to create the text, graphics or images.

In some cases the pattern of target colors may be within the gamut of colors that can be printed using a given combination of reflective toners then printer processor 82 will apply a color compression algorithm that converts the color gamut of the target colors into a color gamut that can be printed. Such color compression algorithms creates a pattern of target colors that provide a best approximation of a print that is to be made according to the image data and printing instructions using the color gamut available using a combination of predetermined toner colors. However, such algorithms themselves can introduce noise into an image.

A plurality of reflective toner color images is then generated for combination in register to form the pattern of toner colors (step 204). This can be done using conventional color separation processes that determine an amount of each toner color that is to be used location on a receiver 26 to form a print.

Figure 6A:
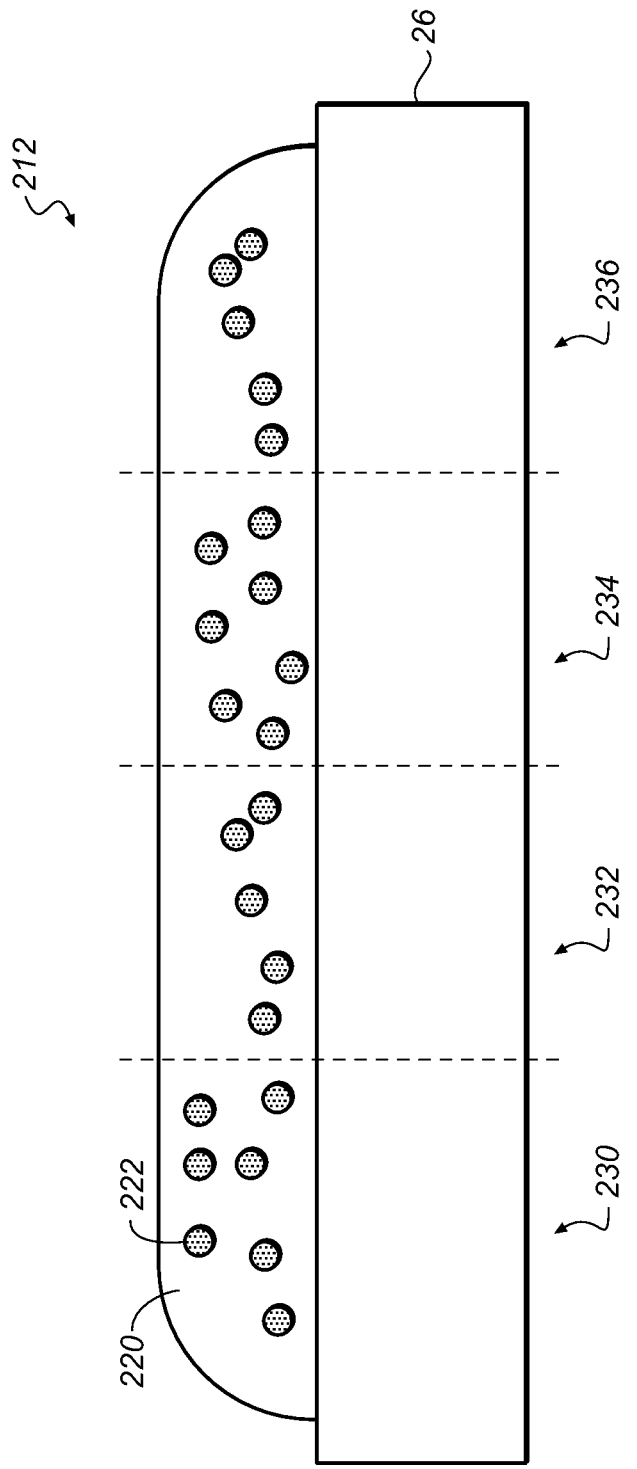
FIG. 6A is a sectional view of a fused toner print on a patch of receiver having a density in an intermediate range of reflective toner densities and noise.

A noise evident portion of the pattern of target colors is then identified (step 206). As used herein, the term noise evident portion includes any portion of an image where noise can create density variations that are apparent from unaided observation. FIGS. 6A, 6B and 6C provide illustrative examples of different fused toner images having densities in an intermediate range (FIG. 6A), a high density range (FIG. 6B) and a low density range (FIG. 6C).

In FIG. 6A, a first fused toner mass 212 is provided having a binder material 220 and reflective colorant particles 222 distributed across four printed areas 230, 232, 234 and 236. As is suggested by the number of reflective colorant particles 222 in areas 230, 232, 234 and 236, a larger number of reflective colorant particles 222 is located in areas 230 and 234 than in areas 232 and 236. This difference in the number of reflective colorant particles 222 can be created, for example, when noise causes more reflective colorant bearing toner to be provided in areas 230 and 234 than in areas 232 and 236. This causes areas 230 and 234 to have a density that is visually different from a density in areas 232 and 236.

FIG. 6B illustrates an example of a sectional view of a fused toner print 70 on a patch of a receiver 26 having areas 240, 242, 244 and 246 printed to have a common target color in a high density range. In FIG. 6B, a second fused toner mass 214 is provided having a binder material 220 and reflective colorant particles 222 in four printed areas 240, 242, 244 and 246. As is suggested by the comparative number of reflective colorant particles 222 in areas 240, 242, 244 and 246, there are a greater number of reflective colorant particles 222 in areas 240 and 244 than in areas 242 and 246. The greater number of reflective toner particles in areas 242 and 246 can be caused when more toner is transferred onto areas 240 and 244 than areas 242 and 246 because of noise. The additional reflective colorant 222 in areas 242 and 246 in turn cause areas 240 and 244 to have a greater density than areas 242 and 246.

As is suggested in FIG. 6B that when target colors used for printing are in a high density range, density variations caused by noise are significantly less evident as these variations create only a small difference in the overall colorant concentration at areas 240, 242, 244, and 246.

FIG. 6C illustrates an example of a sectional view of a fused toner print 70 on a patch of a receiver 26 having areas 250, 252, 254 and 256 printed to have a common target color in a low density range. In FIG. 6C, a third fused toner mass 216 is provided having a binder material 220 and reflective colorant particles 222 in four printed areas 250, 252, 254 and 256. As is suggested by the comparative number of reflective colorant particles 222 in areas 250, 252, 254 and 256, there are a greater number of reflective colorant particles 222 in areas 250 and 254 than in areas 252 and 256. The greater number of reflective toner particles in areas 242 and 256 can arise when more toner is transferred onto areas 250 and 254 than areas 252 and 256 because of noise. The additional reflective colorant 222 in areas 252 and 256 in turn cause areas 250 and 244 to have a greater density than areas 252 and 256.

It will be appreciated from FIG. 6C, that substantially all light that passes through toner image 216 to receiver 26 will be reflected by receiver 26 and that when target colors used for printing are in a low density range, density variations caused by noise are less evident as these variations create only a small differences in color at such areas 250, 252, 254, and 256.

Accordingly, a noise evident portion of a toner print will primarily exist where target colors are in an intermediate density range. By focusing noise reduction techniques on the intermediate-density regions it becomes possible to approach noise reduction in a manner that will have the most significant visual impact while limiting unintended effects such as may arise if noise reduction strategies are applied in regions where such correction strategies have a more limited impact. In certain embodiments, the intermediate density range can extend from a density of 0.2 to a density of 0.9 as measured by an X-rite densitometer fitted with an appropriate Status A filter. In other embodiments, such a noise evident portion is a portion of the fused toner print having a reflection density that is between about 0.4 and 0.7.

Additionally, it will be understood that human visual acuity has a well developed ability to detect sharp changes in contrast in a field of view. Thus, sharp transitions in density such as those that occur at boundaries between 230, 232, 234 and 236 tend to be more noticeable.

As is noted above, conventionally, a variety of noise filtering algorithms have been used to provide some means for reducing the amount of noise evident in a toner print. However, as is noted above, such techniques do not completely resolve the noise problem, are computationally intensive, and can actually introduce noise in some cases.

The applicants, however, have discovered that by introducing fluorescent toners colors in such intermediate density regions, it becomes possible to reduce apparent sharpness of such transitions and to thereby make it more difficult for an observer to detect noise induced density differences in a toner print.

Figure 7:
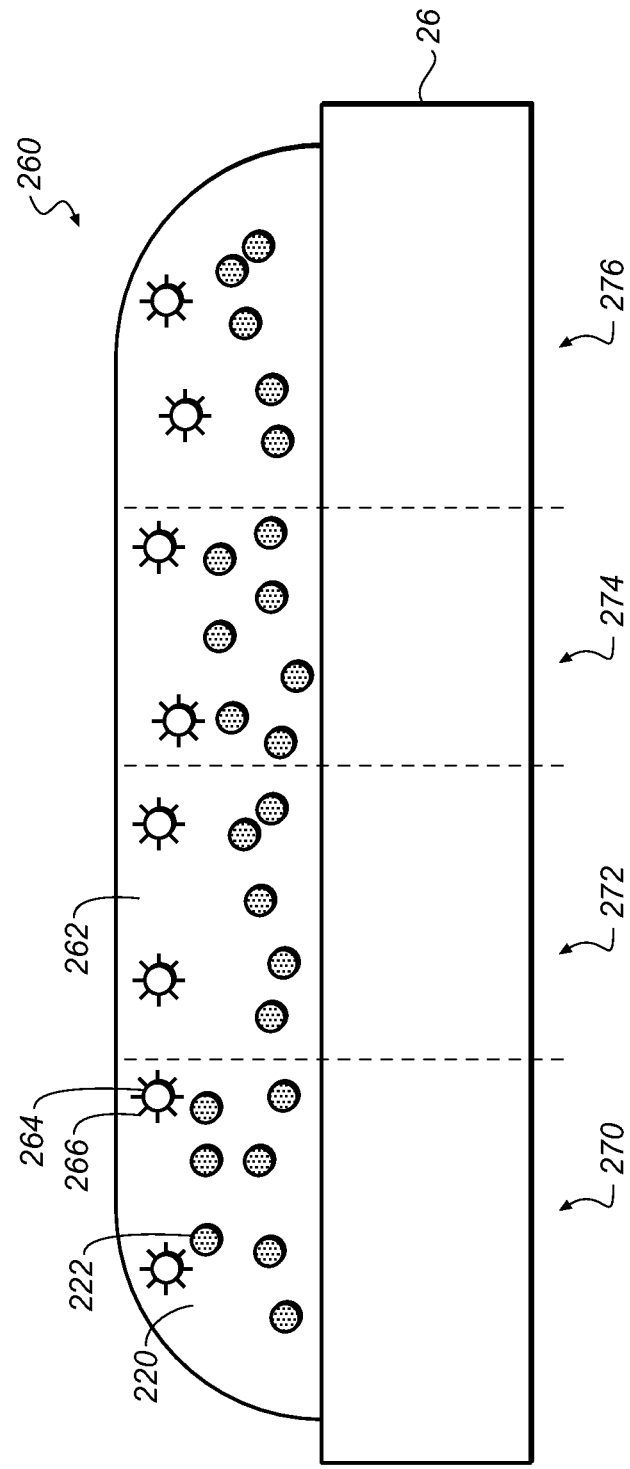
FIG. 7 is a sectional view of a fused toner print on a patch of receiver having an intermediate range reflective toner densities and a fluorescent toner.

FIG. 7 illustrates a side section view of a toner print 260 having a fused toner mass 262 including generally transparent binder material 220, having reflective toner colorants 222 for a plurality of areas 270, 272, 274 and 276 that are provided to form common intermediate range density and that have a noise influenced non-uniform distribution of reflective toner colorants 222. The non-uniform distribution of reflective colorants 222 creates density variation causing areas 270 and 274 that have greater density than adjacent areas 272 and 276.

However, as is also shown in FIG. 7, fused toner mass 262 also includes fluorescent colorant particles 264 that are distributed in the fused toner mass and that each emit fluorescent color light in many directions in the fused toner mass. Each of these fluorescent colorant particles 264 acts as an individual light emitter in fused toner mass 262 and emits fluorescent color light 266 that travels in all directions through fused toner mass 262. This creates a diffuse fluorescent color light in fused toner mass 262 that reduces the apparent sharpness of density transitions between adjacent areas having noise induced density variations. Such softer transitions make the transitions less apparent and help to reduce the noise in the toner image.

The diffuse light therefore provides a capability to generate a toner image having noise in the intermediate range density with reduced apparent noise levels but without requiring the use of noise reduction algorithms or the risk that such algorithms can cause an increase in noise.

Accordingly in the embodiment of FIG. 5, a fluorescent color image is generated (step 208) that when printed using a corresponding fluorescent toner will generate a diffuse fluorescent color light that reduces the extent to which noise induced variations in density in the noise evident portion are observable.

The fluorescent color image used for such noise management purposes can be determined based upon a variety of factors including factors such as anticipated signal to noise ratio in the noise evident portions, a measured signal to noise ratio in the noise evident portions, known noise characteristics of the toner printer. In one embodiment, the level of fluorescent toner color can be selected based at least in part upon the type of receiver 26 to be used in printing. In one case the level of fluorescent toner color can be selected based upon a known or anticipated level of noise in the receiver 26. In two examples of this, the fluorescent toner color can at a level that is anticipated to compensate for expected variations in grain in the receiver or to help conceal expected noise in concentrations of optical brighteners in receiver 24. In one embodiment, the amount of fluorescent toner applied at least a luminance such as can be measured in LAB space as having an L* of at least 60. In other embodiments, the luminance provided by the fluorescent toner can have an L* of at least 70-80.

In one embodiment the fluorescent toner is applied in a generally uniform amount in any identified noise evident portion of a toner image.

However, the addition of fluorescent toner color to the combination of to a previously determined combination of one or more reflective toner colors at an image location can cause a combination of toner colors that does not correspond with the desired target color. Accordingly, in the embodiment of FIG. 5, the plurality of reflective toner images is adjusted so that when the reflective toner colors are combined with the fluorescent toner color, the determined pattern of target colors is formed (step 210).

In one embodiment, where the hue angle of one of the reflective toner colors and a hue angle of the fluorescent toner color are within 10 degrees at any density it may be possible to make adjustments using a substitution strategy where similar toner reflective toner colors used to form a target color at a region that is in the mid tone range of densities is reduced to accommodate for the introduction of the fluorescent toner at that location.

In still other embodiments, the color spectrum of the color of the fluorescent toner color and a reflective toner color for a reflective toner image overlaps by at least about 25% and with increasing the printer processor 82 increases the amount of the spectrally overlapping toner as the amount of fluorescent toner is decreased.

In other embodiments, the hue angle of the fluorescent toner color is not well aligned such as where there is a 10 degree difference between the hue angle of the fluorescent toner color and a hue angle of any of the reflective toner colors. In such embodiments, printer processor 82 adjusts the amounts of more than one of the reflective toner colors used at the location in ways that can be combined with the fluorescent toner image to provide the pattern of target colors.

Similarly, where there is less than a 25 percent overlap in the spectral distribution of the fluorescent toner color and any of the reflective toner colors, printer processor 82 adjusts the amounts of more than one of the reflective toner colors used at the location in ways that can be combined with the fluorescent toner image to provide the pattern of target colors.

Printer controller 82 then determines a toner color separation images for combination in register to form the target color image (step 212). Generally, this involves developing toner color images for each of the toner colors that are to be used during printing based upon a subtractive color model for the toners to be used in making the print and factoring in the additional illumination provided by the fluorescent toner in the noise evident portions. The reflective toner color separation images and the fluorescent toner color separation image can be stored until used. Where such images are created at an external device 92 such as by a DFE, a mainframe computer, a server or a remote personal computer or other personal computing device, such reflective toner color separation images can be stored and later transmitted at a time of printing to communication system 90. The reflective toner color images and the fluorescent toner color images can be further processed in any conventional manner to the extent that such processing may be necessary to form toner color separation images. Such toner color separation images define specific toner color contributions for each individually addressable area of the print to be made.

In the embodiment of FIG. 1, the reflective toner color separation images and the fluorescent toner separation image are then submitted to halftone image processor 98 also known as a raster image processor (RIP) that converts the reflective toner color images and the fluorescent toner color image into halftone dot image data in the respective color using matrices, which comprise desired screen angles and screen rulings. The RIP may be a suitably programmed computer and/or logic devices and is adapted to employ stored or generated matrices and templates for processing separated color image data into rendered image data in the form of halftone information suitable for printing.

The halftone processed toner color images and the halftone processed fluorescent toner color image can also be stored until used. When used, these can be submitted to frame or line buffers that convey the reflective toner color images to respective writers 130 in printing modules 40-48 which then convert the reflective toner images and fluorescent toner image into patterns of toner such as patterns of reflective black, yellow, magenta, cyan, toners and a pattern of fluorescent color toner respectively.

The half-tone processed reflective toner color images are then used to form a reflective toner image using a toner that forms a color that corresponds to the reflective toner color (step 216). For example, a cyan toner color image is converted into a cyan toner image having a toner with a cyan colorant therein arranged according to the cyan toner image. Similarly, the fluorescent toner color image is converted into a fluorescent toner image having a pattern of a corresponding fluorescent toner having with a fluorescent colorant arranged according to the fluorescent toner color image.

The reflective toner images and the fluorescent toner image are transferred in registration onto a receiver (step 218) and a bond is formed between the toner images and the receiver (step 219) such as by fusing, fixing, sintering or otherwise creating such a bond.

Figure 8:
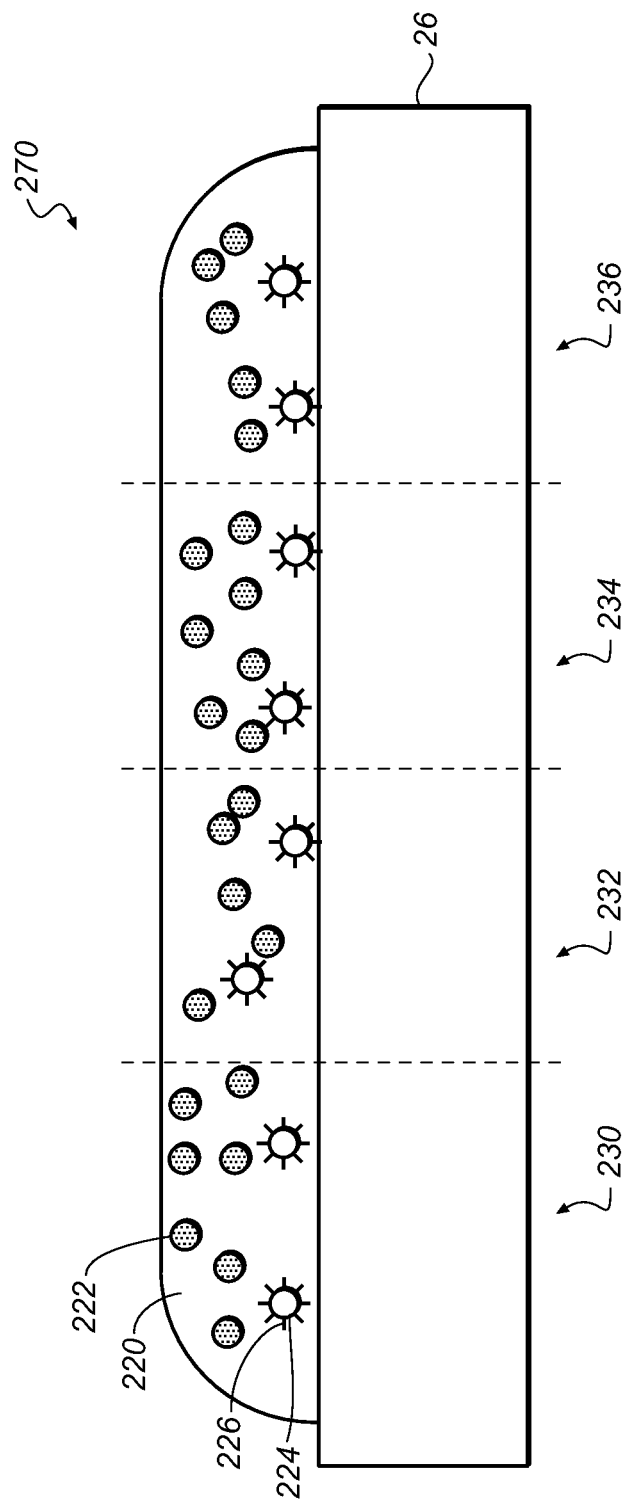
FIG. 8 is a sectional view of a fused toner print on a patch of receiver having intermediate range reflective toner densities and a fluorescent toner.

FIG. 8 illustrates another toner print 270. In this embodiment a toner having fluorescent colorant 224 is provided in, for example, printing module 40 of FIG. 1 and is transferred first to receiver 26. Printing modules 42-48 then transfer at one or more toners that supply reflective colorant 222. This approach allows the reflective colorant 222 to modulate fluorescent light 226 from fluorescent colorant particles 224. Such modulation can be achieved either by limiting amounts of non-visible light reaching fluorescent colorant particles 224 or by absorbing portions of fluorescent color light emitted by the fluorescent toner.

In either embodiment, amounts of both fluorescent toner and reflective toner are determined based upon the knowledge that reflective colorant will be positioned between the fluorescent colorant 224 and the source of illuminating light.

Accordingly, a higher concentration of fluorescent colorant 224 is used in this embodiment than is used in embodiments such as the embodiment of FIG. 7 where the fluorescent toner is transferred to the receiver after the reflective toners have been transferred. In some cases, less reflective toner may be required in the embodiment of FIG. 8, given that the all fluorescent light emitted by the fluorescent colorant will be modulated by the reflective toner.

It will be appreciated that any or all of the processes of generating a plurality of reflective toner images (step 202), generating a fluorescent toner color image (step 208) and adjusting the plurality of reflective toner color images (step 210) can be performed based at least in part upon the order of the toners to be used to print an image or based upon the color characteristics of particular toners to be used. Further, the steps of generating a fluorescent color image (step 208) and adjusting the plurality of reflective toner color images (step 210) can be performed based at least in part upon a presumed illumination of a fused toner print 260 by a light having a predetermined intensity of non-visible light at wavelengths will cause fluorescent emission from the fluorescent colorants.

Examples of Fluorescent Color Toner

The following provides non-limiting examples of fluorescent toners that can be used in various embodiments. As is used in the following, fluorescent toner color refers to a color of light provided by a fluorescent toner when illuminated The term "reflective toner" as in the following refers to dry non-fluorescing color toner particles containing one or more non-fluorescing colorants (dyes or pigments) that provide a color or hue having an optical density of at least 0.2 at the maximum exposure so as to distinguish them from "colorless" dry toner particles that have a lower optical density. By non-fluorescing colorants, it is meant that the colorants do not emit light or "fluoresce" upon exposure to light of a different wavelength to a significant degree.

The term "fluorescent toner" as used in the following refers to a colorant, dry toner particle, or toner image that provides a color or hue having an optical density of at least 0.2 at the maximum exposure to irradiating light, so as to distinguish them from "colorless" or "substantially clear" fluorescing colorants, toner particles, or toner images as described for example in U.S. Patent Application Publication 2010/0164218 (noted above). The "visible fluorescing magenta" colorants and dry toner particles emit as one or more peak wavelengths of at least 510 nm and up to and including 590 nm, and particular at one or more peak wavelengths of at least 520 nm and up to and including 580 nm.

The term "peak wavelength" in reference to the visible fluorescing magenta colorants in the visible fluorescing magenta dry toner particles means an emission peak within the noted range of wavelengths that provides the desired fluorescing magenta effect according to this invention. There can be multiple peak wavelengths for a given visible fluorescing colorant. It is not necessary that the $\lambda_{max}$ be within the noted range of wavelengths or that the peak wavelength of interest be the $\lambda_{max}$. However, many useful visible fluorescing colorants will have a $\lambda_{max}$ within the noted range of wavelengths and this $\lambda_{max}$ can also be the desired "peak" wavelength.

The term "composite", when used in reference to developed color toner images or developed and fixed color toner images, refers to the combination of at least 2 (for example, CM) and up to 4 (for example, CYMK), non-fluorescing color toner images in the same multicolor toner image.

The term "covering power" refers to the coloring strength (optical density) value of fixed dry toner particles on a specific receiver material, or the ability of the fixed dry toner particles to "cover" or hide radiation reflected from the receiver material. For example, covering power values can be determined by making patches of varying densities from non-fixed dry toner particles on a receiver material such as a clear film. The weight and area of each of these patches is measured, and the dry toner particles in each patch are fixed for example in an oven with controlled temperature that is hot enough to melt the dry toner particles sufficiently to form a continuous thin film in each patch on the receiver material. The transmission densities of the resulting patches of thin films are measured with a Status A blue filter on an X-rite densitometer (other conventional densitometers can be used). A plot of the patch transmission densities vs. initial patch dry toner weight is prepared, and the weight per unit area of toner thin film is calculated at a transmission density of 1.0. The reciprocal of this value, in units of $cm^2/g$ of fixed dry toner particles, is the "covering power". Another way of saying this is that the covering power is the area of the receiver material that is covered to a transmission density of 1.0 by 1 gram of dry toner particles. As the covering power increases, the "yield" of the dry toner particles increases, meaning that less mass of dry toner particles is needed to create the same amount of density area coverage in a printed image on the receiver material. Thus, covering power is a measurement that is taken after the dry toner particles are fixed (or fused) to a given receiver material. A skilled worker would be able from this description to measure the covering power of any particular dry toner particle composition (containing polymer binder, colorants, and optional addenda), receiver material, and fixing conditions as used in the practice of this invention.

Dry Toner Particles

In this example, dry toner particles and compositions of multiple dry toner particles in dry developers (described below) can be used for reproduction of a fluorescing hue or effect, particularly a visible fluorescing magenta hue that can have the appearance of a "pink" fluorescing hue, by an electrostatic printing process, especially by an electrophotographic imaging process.

These visible fluorescing magenta dry toner particles can be porous or nonporous. For example, if they are porous particles, up to 60% of the volume can be occupied or unoccupied pores within the polymeric binder phase (matrix). The visible fluorescing magenta colorants can be within the pores or within the polymeric binder phase. In many embodiments, the visible fluorescing magenta dry toner particles are not purposely designed to be porous although pores may be created unintentionally during manufacture. In such "nonporous" embodiments, the porosity of the visible fluorescing magenta toner particles used in this example is less than 10% based on the total particle volume within the external particle surface, and the visible fluorescing magenta colorants are predominantly (at least 90 weight %) in the polymeric binder phase.

The visible fluorescing magenta dry toner particles used in this example are generally non-magnetic in that magnetic materials are not purposely incorporated within the polymeric binder phase.

The visible fluorescing magenta dry toner particles have an external particle surface and consist essentially of a polymeric binder phase and one or more visible fluorescing magenta colorants (described below) that are generally uniformly dispersed within the polymeric binder phase to provide, when fixed (or fused) and excited by appropriate radiation, the fluorescing magenta effects described herein.

As described in more detail below, these visible fluorescing magenta dry toner particles can be used for imaging in combination with non-fluorescing dry color toner particles that provide one or more non-fluorescing colors in a color toner image.

Optional additives (described below) can be incorporated into the visible fluorescing magenta dry toner particles used in this invention to provide various properties that are useful for electrostatic printing processes. However, only the polymeric binder phase and the visible fluorescing magenta colorants described herein are essential for providing the desired fluorescing magenta effects in a fixed color toner image and for this purpose, they are the only essential components of the visible fluorescing magenta dry toner particles.

The polymeric binder phase is generally a continuous polymeric phase comprising one or more polymeric binders that are suitable for the various imaging methods described herein. Many useful binder polymers are known in the art as being suitable for forming dry toner particles as they will behave properly melt and flow) during thermal fixing of the toner particles to a suitable receiver material. Such polymeric binders generally are amorphous and each has a glass transition temperature ($T_g$) of at least 50° C. and up to and including 100° C. In addition, the visible fluorescing magenta dry toner particles prepared from these polymeric binders have a caking temperature of at least 50° C. so that the visible fluorescing magenta dry toner particles can be stored for relatively long periods of time at fairly high temperatures without having individual particles agglomerate and clump together.

Useful polymeric binders for providing the polymeric binder phase include but are not limited to, polycarbonates, resin-modified malic alkyd polymers, polyamides, phenol-formaldehyde polymers and various derivatives thereof, polyester condensates, modified alkyd polymers, aromatic polymers containing alternating methylene and aromatic units, and fusible crosslinked polymers.

Other useful polymeric binders are vinyl polymers, such as homopolymers and copolymers derived from two or more ethylenically unsaturated polymerizable monomers. For example, useful copolymers can be derived one or more of styrene or a styrene derivative, vinyl naphthalene, p-chlorostyrene, unsaturated mono-olefins such as ethylene, propylene, butylene, and isobutylene, vinyl halides such as vinyl chloride, vinyl bromide, and vinyl fluoride, vinyl acetate, vinyl propionate, vinyl benzoate, vinyl butyrate, vinyl esters such as esters of mono carboxylic acids including acrylates and methacrylates, acrylonitrile, methacrylonitrile, acrylamides, methacrylamide, vinyl ethers such as vinyl methyl ether, vinyl isobutyl ether, and vinyl ethyl ether, N-vinyl indole, N-vinyl pyrrolidone, and others that would be readily apparent to one skilled in the electrophotographic polymer art.

For example, homopolymers and copolymers derived from styrene or styrene derivatives can comprise at least 40 weight % and to and including 100 weight % of recurring units derived from styrene or styrene derivatives (homologs) and from 0 to and including 40 weight % of recurring units derived from one or more lower alkyl acrylates or methacrylates (the term "lower alkyl" means alkyl groups having 1 to 6 carbon atoms). Other useful polymers include fusible styrene-acrylic copolymers that are partially crosslinked by incorporating recurring units derived from a divinyl ethylenically unsaturated polymerizable monomer such as divinylbenzene or a diacrylate or dimethacrylate. Polymeric binders of this type are described, for example, in U.S. Reissue Pat. 31,072 (Jadwin et al.) that is incorporated herein by reference. Mixtures of such polymeric binders can be used if desired.

Some useful polymeric binders are derived from styrene or another vinyl aromatic ethylenically unsaturated polymerizable monomer and one or more alkyl acrylates, alkyl methacrylates, or dienes wherein the styrene recurring units comprise at least 60% by weight of the polymer. For example, copolymers that are derived from styrene and either butyl acrylate or butadiene are also useful as polymeric binders, or these copolymers can be part of blends of polymeric binders. For example, a blend of poly(styrene-co-butyl acrylate) and poly(styrene-co-butadiene) can be used wherein the weight ratio of the first polymeric binder to the second polymeric binder is from 10:1 to 1:10, or from 5:1 to 1:5.

Styrene-containing polymers are particularly useful and can be derived from one or more of styrene, α-methylstyrene, p-chlorostyrene, and vinyl toluene. Useful alkyl acrylates, alkyl methacrylates, and monocarboxylic acids that can be copolymerized with styrene or styrene derivatives include but are not limited to, acrylic acid, methyl acrylate, 2-ethylhexyl acrylate, 2-ethylhexyl methacrylate, ethyl acrylate, butyl acrylate, dodecyl acrylate, octyl acrylate, phenyl acrylate, methacrylic acid, ethyl methacrylate, butyl methacrylate, and octyl methacrylate.

Condensation polymers are also useful as polymeric binders in the visible fluorescing magenta dry toner particles. Useful condensation polymers include but are not limited to, polycarbonates, polyamides, polyesters, polywaxes, epoxy resins, polyurethanes, and polymeric esterification products of a polycarboxylic acid and a diol comprising a bisphenol. Particularly useful condensation polymer binders include polyesters and copolyesters that are derived from one or more aromatic dicarboxylic acids and one or more aliphatic diols, including polyesters derived from isophthalic or terephthalic acid and diols such as ethylene glycol, cyclohexane dimethanol, and bisphenols (such as Bisphenol A). Other useful polyester binders can be obtained by the co-polycondensation polymerization of a carboxylic acid component comprising a carboxylic acid having two or more valencies, an acid anhydride thereof or a lower alkyl ester thereof (for example, fumaric acid, maleic acid, maleic anhydride, phthalic acid, terephthalic acid, trimellitic acid, or pyromellitic acid), using as a diol component a bisphenol derivative or a substituted compound thereof. Other useful polyesters are copolyesters prepared from terephthalic acid (including substituted terephthalic acid), a bis[(hydroxyalkoxy)phenyl]alkane having 1 to 4 carbon atoms in the alkoxy radical and from 1 to 10 carbon atoms in the alkane moiety (that can also be a halogen-substituted alkane), and an alkylene glycol having from 1 to 4 carbon atoms in the alkylene moiety. Specific examples of such condensation copolyesters and how they are made are provided for example in U.S. Pat. Nos. 5,120,631 (Kanbayashi et al.), 4,430,408 (Sitaramiah), and 5,714,295 (Wilson et al.), all of which are incorporated herein by reference for describing such polymeric binders. A useful polyester is a propoxylated bisphenol—A fumarate.

Useful polycarbonates are described in U.S. Pat. No. 3,694,359 (Merrill et al.) that is incorporated by reference, which polycarbonates can contain alklidene diarylene moieties in recurring units.

Other specific polymeric binders useful in the visible fluorescing magenta dry toner particles are described in [0031] of U.S. Patent Application Publication 2011/0262858 (noted above) that is incorporated herein by reference.

In some embodiments, the polymeric binder phase comprises a polyester or a vinyl polymer derived at least in part from styrene or a styrene derivative, both of which are described above.

In general, one or more polymeric binders are present in the visible fluorescing magenta dry toner particles in an amount of at least 50 weight % and up to and including 80 weight %, or typically at least 60 weight % and up to and including 75 weight %, based on the total visible fluorescing magenta dry toner particle weight.

The visible fluorescing magenta dry toner particles used in this example are not generally perfectly spherical so it is best to define them by the mean volume weighted diameter ($D_{vol}$) that can be determined as described above. Before fixing, the $D_{vol}$ can be at least 4 μm and up to and including 20 μm and typically at least 5 μm and up to and including 12 μm, but larger or smaller particles may be useful in certain embodiments. Some very small particles can be considered as "liquid" toner particles.

The visible fluorescing magenta colorants useful in the practice of this example can be chosen from any of such pigments and dyes that are known in the art for emitting at one or more peak wavelengths of at least 510 nm and up to and including 590 nm, or at least 520 and up to and including 580 nm. Such compounds can be readily determined from such sources as Honeywell International (New Jersey), Union Pigment (Hongzhau, China), Dayglo Corporation (Ohio), Clariant Corporation (Rhode Island), H.W. Sands (Jupiter Florida), Sun Chemicals (Ohio), and Risk Reactor (California).

For example, useful visible fluorescing magenta colorant classes are rhodamine, perylene, naphthalimide, and anthrone classes of fluorescing magenta colorants that emit at one or more peak wavelengths of at least 510 nm and up to and including 590 nm, or one or more peak wavelengths of at least 520 nm and up to and including 590 nm.

Mixtures of two or more of the visible fluorescing magenta colorants as described herein can be used if desired. In some embodiments, one or more fluorescing magenta colorants can be used in combination with one or more colorless or visible non-magenta fluorescing colorants.

The one or more visible fluorescing magenta colorants are generally present in the visible fluorescing magenta dry toner particles in an amount of at least 0.5 weight % and up to and including 20 weight %, or typically at least 2 weight % and up to and including 12 weight %, based on the total visible fluorescing magenta dry toner particle weight.

Various optional additives that can be present in the visible fluorescing magenta dry toner particles can be added in the dry blend of polymeric resin particles and visible fluorescing magenta colorants as described below. Such optional additives include but are not limited to, non-fluorescing colorants (such as dyes and pigments), charge control agents, waxes, fuser release aids, leveling agents, surfactants, stabilizers, or any combinations of these materials. These additives are generally present in amounts that are known to be useful in the electrophotographic art as they are known to be used in other dry toner particles, including dry color toner particles.

In some embodiments, a spacing agent, fuser release aid, flow additive particles, or combinations of these materials can be provided on the outer surface of the visible fluorescing magenta dry toner particles, and such materials are provided in amounts that are known in the electrophotographic art. Generally, such materials are added to the visible fluorescing magenta dry toner particles after they have been prepared using the dry blending, melt extrusion, and breaking process (described below).

Inorganic or organic non-fluorescing colorants (pigments or dyes) can be present in the visible fluorescing magenta dry toner particles to provide any suitable color, tone, or hue other than fluorescing magenta effect described herein. Most visible fluorescing magenta dry toner particles used in the practice of this example are free of non-fluorescing colorants (fluoresce to an insubstantial amount at the noted wavelengths).

Such non-fluorescing colorants can be incorporated into the polymeric binders in known ways, for example by including them in the dry blends described below. Useful colorants or pigments include but are not limited to the following compounds unless they are visible fluorescing magenta colorants: titanium dioxide, carbon black, Aniline Blue, Calcoil Blue, Chrome Yellow, Ultramarine Blue, DuPont Oil Red, Quinoline Yellow, Methylene Blue Chloride, Malachite Green Oxalate, Lamp Black, Rose Bengal, Colour Index Pigment Red 48:1, Colour Index Pigment Red 57:1, Colour Index Pigment Yellow 97, Colour Index Pigment Yellow 17, Colour Index Pigment Blue 15:1, Colour Index Pigment Blue 15:3, phthalocyanines such as copper phthalocyanine, mono-chlor copper phthalocyanine, hexadecachlor copper phthalocyanine, Phthalocyanine Blue or Colour Index Pigment Green 7, and quinacridones such as Colour Index Pigment Violet 19 or Colour Index Pigment Red 122, and pigments such as HELIOGEN Blue™, HOSTAPERM Pink™, NOVAPERM Yellow™, LITHOL Scarlet™, MICROLITH Brown™, SUDAN Blue™, FANAL Pink™, and PV FAST Blue™. Mixtures of colorants can be used. Other suitable non-fluorescing colorants are described in U.S. Reissue Pat. 31,072 (noted above), U.S. Pat. No. 4,160,644 (Ryan), U.S. Pat. No. 4,416,965 (Sandhu et al.), and U.S. Pat. No. 4,414,152 (Santilli et al.), all of which are incorporated herein by reference.

One or more of such non-fluorescing colorants can be present in the visible fluorescing magenta dry toner particles in an amount of at least 1 weight % and up to and including 20 weight %, or typically at least 2 to and including 15 weight %, based on total visible fluorescing magenta dry toner particle weight, but a skilled worker in the art would know how to adjust the amount of colorant so that the desired fluorescing magenta effect can be obtained when the visible fluorescing magenta colorants are mixed with the non-fluorescing colorants.

The colorants can also be encapsulated using elastomeric resins that are included within the visible fluorescing magenta dry toner particles. Such a process is described in U.S. Pat. No. 5,298,356 (Tyagi et al.) that is incorporated herein by reference.

Suitable charge control agents and their use in toner particles are well known in the art as described for example in the 1991 Handbook of Imaging Materials, $2^{nd}$ Edition, Marcel Dekker, Inc., New York, ISBN 0-8247-8451-0, Chapter 4, Dry Toner Technology, Robert J. Gruber and Paul C. Julien, 4.3.4. Charging, Page 180 and references noted therein. The term "charge control" refers to a propensity of the material to modify the triboelectric charging properties of the visible fluorescing magenta dry toner particles. A wide variety of charge control agents can be used as described in U.S. Pat. No. 3,893,935 (Jadwin et al.), U.S. Pat. No. 4,079,014 (Burness et al.), U.S. Pat. No. 4,323,634 (Jadwin), U.S. Pat. No. 4,394,430 (Jadwin et al.), U.S. Pat. No. 4,624,907 (Nimura et al.), U.S. Pat. No. 4,814,250 (Kwarta et al.), U.S. Pat. No. 4,840,864 (Bugner et al.), U.S. Pat. No. 4,834,920 (Bugner et al.), and U.S. Pat. No. 4,780,553 (Suzuki et al.), all of which are incorporated herein by reference. The charge control agents can be transparent or translucent and free of pigments and dyes. Generally, these compounds are colorless or nearly colorless. Mixtures of charge control agents can be used. A desired charge control agent can be chosen depending upon whether a positive or negative charging visible fluorescing magenta dry toner particle is needed.

Examples of useful charge control agents include but are not limited to, triphenylmethane compounds, ammonium salts, aluminum-azo complexes, chromium-azo complexes, chromium salicylate organo-complex salts, azo-iron complex salts, an azo-iron complex salt such as ferrate (1-), bis[4-[5-chloro-2-hydroxyphenyl)azo]-3-hydroxy-N-phenyl-2-naphthalene-carboxamidato(2-)], ammonium, sodium, or hydrogen (Organoiron available from Hodogaya Chemical Company Ltd.). Other useful charge control agents include but are not limited to, acidic organic charge control agents such as 2,4-dihydro-5-methyl-2-phenyl-3H-pyrazol-3-one (MPP) and derivatives of MPP such as 2,4-dihydro-5-methyl-2-(2,4,6-trichlorophenyl)-3H-pyrazol-3-one, 2,4-dihydro-5-methyl-2-(2,3,4,5,6-pentafluorophenyl)-3H-pyrazol-3-one, 2,4-dihydro-5-methyl-2-(2-trifluoroethylphenyl)-3H-pyrazol-3-one and the corresponding zinc salts derived therefrom. Other examples include charge control agents with one or more acidic functional groups, such as fumaric acid, malic acid, adipic acid, terephthalic acid, salicylic acid, fumaric acid monoethyl ester, copolymers derived from styrene and methacrylic acid, copolymers of styrene and lithium salt of methacrylic acid, 5,5'-methylenedisalicylic acid, 3,5-di-t-butylbenzoic acid, 3,5-di-t-butyl-4-hydroxybenzoic acid, 5-t-octylsalicylic acid, 7-t-butyl-3-hydroxy-2-napthoic acid, and combinations thereof. Still other acidic charge control agents which are considered to fall within the scope of the example include N-acylsulfonamides, such as, N-(3,5-di-t-butyl-4-hydroxybenzoyl)-4-chlorobenzenesulfonamide and 1,2-benzisothiazol-3(2H)-one 1,1-dioxide. Another class of charge control agents include, but are not limited to, iron organo metal complexes such as organo iron complexes, for example T77 from Hodogaya. Still another useful charge control agent is a quaternary ammonium functional acrylic polymer.

Other useful charge control agents include alkyl pyridinium halides such as cetyl pyridinium halide, cetyl pyridinium tetrafluoroborates, quaternary ammonium sulfate, and sulfonate charge control agents as described in U.S. Pat. No. 4,338,390 (Lu) that is incorporated herein by reference, stearyl phenethyl dimethyl ammonium tosylates, distearyl dimethyl ammonium methyl sulfate, and stearyl dimethyl hydrogen ammonium tosylate.

One or more charge control agents can be present in the visible fluorescing magenta dry toner particles in an amount to provide a consistent level of charge at least −40 μCoulomb/g to and including −5 μCoulomb/g, when charged. Examples of suitable amounts include at least 0.1 weight % to and including 10 weight %, based on the total visible fluorescing magenta dry toner particle weight.

Useful waxes (can also be known as lubricants) that can be present in the visible fluorescing magenta dry toner particles include low molecular weight polyolefins (polyalkylenes) such as polyethylene, polypropylene, and polybutene, such as Polywax 500 and Polywax 1000 waxes from Peterolite, Clariant PE130 and Licowax PE190 waxes from Clariant Chemicals, and Viscol 550 and Viscol 660 waxes from Sanyo. Also useful are ester waxes that are available from Nippon Oil and Fat under the WE-series. Other useful waxes include silicone resins that can be softened by heating, fatty acid amides such as oleamide, erucamide, ricinoleamide, and stearamide, vegetable waxes such as carnauba wax, rice wax, candelilla wax, Japan wax, and jojoba wax, animal waxes such as bees wax, mineral and petroleum waxes such as montan wax, ozocerite, ceresine, paraffin wax, microcrystalline wax, and Fischer-Tropsch wax, and modified products thereof. Irrespective to the origin, waxes having a melting point in the range of at least 30° C. and up to and including 150° C. are useful. One or more waxes can be present in an amount of at least 0.1 weight % and up to and including 20 weight %, or at least 1 weight % and up to and including 10 weight %, based on the total visible fluorescing magenta dry toner particle weight. These waxes, especially the polyolefins, can be used also as fuser release aids. In some embodiments, the fuser release aids are waxes having 70% crystallinity as measured by differential scanning calorimetry (DSC).

In general, a useful wax has a number average molecular weight ($M_n$) of at least 500 and up to and including 7,000. Polyalkylene waxes that are useful as fuser release aids can have a polydispersity of at least 2 and up to and including 10 or typically of at least 3 and up to and including 5. Polydispersity is a number representing the weight average molecular weight ($M_w$) of the polyalkylene wax divided by its number average molecular weight ($M_n$).

Useful flow additive particles that can be present inside or on the outer surface of the visible fluorescing magenta dry toner particles include but are not limited to, a metal oxide such as hydrophobic fumed silica particles. Alternatively, the flow additive particles can be both incorporated into the visible fluorescing magenta dry toner particles and on their outer surface. In general, such flow additive particles have an average equivalent spherical diameter (ESD) of at least 5 nm and are present in an amount of at least 0.01 weight % and up to and including 10 weight %, based on the total visible fluorescing magenta dry toner particle weight.

Surface treatment agents can also be on the outer surface of the visible fluorescing magenta dry toner particles in an amount sufficient to permit the visible fluorescing magenta dry toner particles to be stripped from carrier particles in a dry two-component developer by electrostatic forces associated with the charged image or by mechanical forces. Surface fuser release aids can be present on the outer surface of the visible fluorescing magenta dry toner particles in an amount of at least 0.05 weight % to and including 1 weight %, based on the total dry weight of visible fluorescing magenta dry toner particles. These materials can be applied to the outer surfaces of the visible fluorescing magenta dry toner particles using known methods for example by powder mixing techniques.

Spacing treatment agent particles ("spacer particles") can be attached to the outer surface by electrostatic forces or physical means, or both. Useful surface treatment agents include but are not limited to, silica such as those commercially available from Degussa as R972 and RY200 or from Wasker as H2000. Other suitable surface treatment agents include but are not limited to, titania, aluminum, zirconia, or other metal oxide particles, and polymeric beads all generally having an ECD of less than 1 μm. Mixture of these materials can be used if desired, for example a mixture of hydrophobic silica and hydrophobic titania particles.

Preparation of Dry Toner Particles

The visible fluorescing magenta dry toner particles used in the practice of this example can be prepared using any suitable manufacturing procedure wherein colorants are incorporated within the particles. Such manufacturing methods include but are not limited to, melt extrusion methods, coalescence, spray drying, and other chemical techniques. The visible fluorescing magenta dry toners can be prepared as "chemically prepared toners", "polymerized toners", or "in-situ toners". They can be prepared using controlled growing instead of grinding. Various chemical processes include suspension polymers, emulsion aggregation, micro-encapsulation, dispersion, and chemical milling. Details of such processes are described for example in the literature cited in [0010] of U.S. Patent Application Publication 2010/0164218 (Schulze-Hagenest et al.) that is incorporated herein by reference. Such dry toner particles can also be prepared using limited coalescence process as described in U.S. Pat. No. 5,298,356 (Tyagi et al.) that is incorporated herein by reference, or a water-in-oil-in-water double emulsion process as described in U.S. Patent Application Publication 2011/0262858 (Nair et al.) that is incorporated herein by reference, especially if porosity is desired in the visible fluorescing magenta dry toner particles. Another method for preparing visible fluorescing magenta dry toner particles is by a spray/freeze drying technique as described in U.S. Patent Application Publication 2011/0262654 (Yates et al.).

In a particularly useful manufacturing method, a desired polymer binder (or mixture of polymeric binders) for use in the visible fluorescing magenta dry toner particles is produced independently using a suitable polymerization process known in the art. The one or more polymeric binders are dry blended or mixed as polymeric resin particles with visible fluorescing magenta colorants (pigments or dyes) to form a dry blend. The optional additives, such as charge control agents, waxes, fuser release aids, and colorants are also incorporated into the dry blend with the two essential components. The amounts of the essential and optional components can be adjusted in the dry blend in a suitable manner that a skilled worker would readily understand to provide the desired amounts in the resulting visible fluorescing magenta dry toner particles. The conditions for mechanical dry blending are known in the art.

For example, the method can comprise dry blending the resin particles with the visible fluorescing magenta colorant(s), such as the rhodamine class fluorescing colorants described above, and a charge control agent, and optionally with a wax or colorant, or any combination of these optional components, to form a dry blend. The dry blend can be prepared by mechanically blending the components for a suitable time to obtain a uniform dry mix.

The dry blend is then melt processed in a suitable apparatus such as a two-roll mill or hot-melt extruder. In some embodiments, the dry melt is extruded under low shear conditions in an extrusion device to form an extruded composition. However, these low shear conditions are not always required in the practice of this example. The melt processing time can be from 1 minute to and including 60 minutes, and the time can be adjusted by a skilled worker to provide the desired melt processing temperature and uniformity in the resulting extruded composition.

For example, it is useful to melt extrude a dry blend of the noted components that has a viscosity of at least 90 pascals sec to and including 2300 pascals sec, or typically of at least 150 pascals sec to and including 1200 pascals sec.

Generally, the dry blend is melt extruded in the extrusion device at a temperature higher than the glass transition temperature of the one or more polymeric binders used to form the polymeric binder phase, and generally at a temperature of at least 90° C. and up to and including 240° C. or typically of at least 120° C. and up to and including 160° C. The temperature results, in part, from the frictional forces of the melt extrusion process.

The resulting extruded composition (sometimes known as a "melt product" or a "melt slab") is generally cooled, for example, to room temperature, and then broken up (for example pulverized) into visible fluorescing magenta dry toner particles having the desired $D_{vol}$ as described above. It is generally best to first grind the extruded composition prior to a specific pulverizing operation. Grinding can be carried out using any suitable procedure. For example, the extruded composition can be crushed and then ground using for example a fluid energy or jet mill as described for example in U.S. Pat. No. 4,089,472 (Seigel et al.). The particles are then further reduced in size by using high shear pulverizing devices such as a fluid energy mill, and then classified as desired.

The resulting visible fluorescing magenta dry toner particles can then be surface treated with suitable hydrophobic flow additive particles having an equivalent circular diameter (ECD) of at least 5 nm to affix such hydrophobic flow additive particles on the outer surface of the particles. These hydrophobic flow additive particles can be composed of metal oxide particles such as hydrophobic fumed oxides such as silica, alumina, or titania in an amount of at least 0.01 weight % and up to and including 10 weight % or typically at least 0.1 weight % and up to and including 5 weight %, based on the total visible fluorescing magenta dry toner particle weight.

In particular, a hydrophobic fumed silica such as R972 or RY200 (from Nippon Aerosil) can be used for this purpose, and the amount of the fumed silica particles can be as noted above, or more typically at least 0.1 weight % and up to and including 3 weight %, based on the total visible fluorescing magenta dry toner particle weight.

The hydrophobic flow additive particles can be added to the outer surface of the visible fluorescing magenta dry toner particles by mixing both types of particles in an appropriate mixer.

The resulting treated visible fluorescing magenta dry toner particles can be classified (sieved) through a 230 mesh vibratory sieve to remove non-attached silica particles and silica agglomerates and any other components that may not have been incorporated into the visible fluorescing magenta dry toner particles. The temperature during the surface treatment can be controlled to provide the desired attachment and blending.

Non-fluorescing dry color toner particles useful in the practice of this example can be prepared in various ways as described above, including the melt extrusion processes described above for the visible fluorescing magenta dry toner particles.

The various non-fluorescing dry color toner particles can be prepared using a suitable polymeric binder phase comprising one or more polymeric binders (as described above) and one or more of non-fluorescing cyan, non-fluorescing yellow, non-fluorescing magenta, or non-fluorescing black colorants. For example, such colorants can be in principle any of the colorants described in the Colour Index, Vols. I and II, $2^{nd}$ Edition (1987) or in the Pantone® Color Formula Guide, $1^{st}$ Edition, 2000-2001. The choice of particular non-fluorescing colorants for the cyan, yellow, magenta, and black (CYMK) color toners is well described in the art, for example in the proceedings of IS&T NIP 20: International Conference on Digital Printing Technologies, IS&T: The Society for Imaging Science and Technology, Salt Lake City, Utah, October 2004, ISBN 089208-253-4, "Enabling Expanded Color Gamut and In-line Coating Processes, Dinesh Tvagi, et al., Pages 135-138. Carbon black is generally useful as the black toner colorant while other colorants for the CYM color toners include but are not limited to, red, blue, and green pigments, respectively. Specific colorants can include copper phthalocyanine and Pigment Blue that can be obtained as Lupreton Blue™ SE1163. Other colorants useful in non-fluorescing dry color toners are also described above as non-fluorescing colorants for the visible fluorescing magenta dry toner particles.

The amount of one or more non-fluorescing colorants in the non-fluorescing dry color toners can vary over a wide range and a skilled worker in the art would know how to pick the appropriate amount for a given non-fluorescing colorant or mixture of colorants. In general, the total non-fluorescing colorants in each non-fluorescing dry color toner can be at least 1 weight % and up to and including 40 weight %, or typically at least 3 weight % and up to and including 25 weight %, based on the total dry color toner weight. The non-fluorescing colorant in each non-fluorescing dry color toner can also have the function of providing charge control, and a charge control agent (as described above) can also provide coloration. All of the optional additives described above for the visible fluorescing magenta dry toner particles used in this example can likewise be used in the non-fluorescing dry color toners.

Developers

The visible fluorescing magenta dry toner particles used in this example can be used as a dry mono-component developer, or combined with carrier particles to form dry two-component developers. In all of these embodiments, a plurality (usually thousands or millions) of individual visible fluorescing magenta dry toner particles are used together.

Such dry mono-component or dry two-component developers generally comprise a charge control agent, wax, lubricant, fuser release aid, or any combination of these materials within the visible fluorescing magenta dry toner particles, or they can also include flow additive particles on the outer surface of the particles. Such components are described above.

Useful dry one-component developers generally include the visible fluorescing magenta dry toner particles as the essential component. Dry two-component developers generally comprise carrier particles (also known as carrier vehicles) that are known in the electrophotographic art and can be selected from a variety of materials. Carrier particles can be uncoated carrier core particles (such as magnetic particles) and core magnetic particles that are overcoated with a thin layer of a film-forming polymer such as a silicone resin type polymer, poly(vinylidene fluoride), poly(methyl methacrylate), or mixtures of poly(vinylidene fluoride) and poly(methyl methacrylate).

The amount of visible fluorescing magenta dry toner particles in a two-component developer can be at least 4 weight % and up to and including 20 weight % based on the total dry weight of the two-component dry developer.

The following examples are provided to illustrate the practice of this example and are not meant to be limiting in any manner.

Dry toner particles were prepared using polymeric binder resin particles that were melt processed in a two roll mill or extruder with appropriate colorants and addenda. A preformed mechanical blend of particulate polymer resin particles, colorants, and toner additives can also be prepared and then roll milled or extruded. Roll milling, extrusion, or other melt processing was performed at a temperature sufficient to achieve a uniform melt processed composition. This composition, referred to as a "melt product" or "melt slab" was then cooled to room temperature. For a polymeric binder having a $T_g$ in the range of from 50° C. to 120° C., or a $T_m$ in the range of from 65° C. to 200° C., a melt blending temperature of from 90° C. to 240° C. was suitable using a roll mill or extruder. The melt blending times (that is, the exposure period for melt blending at elevated temperature) was in the range of from 1 minute to 60 minutes.

The components were dry powder blended in a 40 liter Henschel mixer for 60 seconds at 1000 RPM to produce a homogeneous dry blend that was then melt compounded in a twin screw co-rotating extruder to melt the polymer binder and disperse the pigments, charge agents, and waxes uniformly within the resulting polymeric binder phase. Melt compounding was done at a temperature of 110° C. at the extruder inlet, increasing to 196° C. in the extruder compounding zones, and 196° C. at the extruder die outlet. The melt extrusion conditions were a powder blend feed rate of 10 kg/hr and an extruder screw speed of 490 RPM. The extruded composition (extrudate) was cooled to room temperature and then broken into about 0.32 cm size granules.

These granules were then finely ground in an air jet mill to a $D_{vol}$ of 8 µm as determined using a Coulter Counter Multisizer. The finely ground toner particles were then classified in a centrifugal air classifier to remove very small particles and fines that were not desired in the finished dry toner composition. After classification, the toner particles had a particle size distribution with a width, expressed as the diameter at the 50% percentile/diameter at the 16% percentile of the cumulative particle number versus particle diameter, of 1.30 to 1.35.

The classified toner particles were then surface treated with fumed hydrophobic silica (Aerosil® R972 from Nippon Aerosil) wherein 2000 grams of toner particles were mixed with 20 grams of the fumed hydrophobic silica so that 1 weight % silica was attached to the toner particles, based on total toner particle weight using a 10 liter Henschel mixer with a 3-element impeller for 2 minutes at 2000 RPM.

The silica surface-treated toner particles were sieved using a 300 mesh vibratory sieve to remove non-dispersed silica agglomerates and any toner particle flakes that may have formed during the surface treatment process.

The melt extrusion composition was cooled and then pulverized to a $D_{vol}$ of from about 5 µm to about 20 µm. It is generally preferred to first grind the melt extrusion composition prior to a specific pulverizing operation using any convenient grinding procedure. For example, the solid melt extrusion composition can be crushed and then ground using, for example, a fluid energy or jet mill, such as described in U.S. Pat. No. 4,089,472 (noted above) and the ground particles can then be classified in one or more steps. If necessary, the size of the particles can be further reduced by use of a high shear pulverizing device such as a fluid energy mill and classified again.

Two-component electrographic developers were prepared by mixing toner particles prepared as described above with hard magnetic ferrite carrier particles coated with silicone resin as a concentration of 8 weight % toner particles and 92 weight % carrier particles.

Fluorescent Toner Example 1

A visible fluorescing magenta (pink) dry toner formulation was made with 12,000 g of Reichhold Atlac 382 ES polyester resin, 2200 g of Dayglo WRT-11 Aquabest Pink visible magenta fluorescing colorant, and 293 g of Orient Bontron E-84 charge control agent.

These components were dry blended using a 40 liter Henschel mixer for 60 seconds at 1000 RPM to produce a homogeneous dry blend. The dry blend was then melt compounded in a twin screw co-rotating extruder to melt the polymer binder and disperse the fluorescing colorants, and charge control agent at a temperature of 110° C. at the extruder inlet, 110° C. increasing to 196° C. in the extruder compounding zones, and 196° C. at the extruder die outlet. The processing conditions were a powder blend feed rate of 10 kg/hr and an extruder screw speed of 490 RPM. The cooled extrudate was then chopped to approximately 0.32 cm size granules.

These granules were then finely ground in an air jet mill to an 8 µm $D_{vol}$ as measured using a Coulter Counter Multisizer. The finely ground toner particles were then classified in a centrifugal air classifier to remove very small toner particles and toner fines that are not desired. After this classification, the visible fluorescing magenta toner product had a particle size distribution with a width, expressed as the diameter at the 50% percentile/diameter at the 16% percentile of the cumulative particle number versus $D_{vol}$ of 1.30 to 1.35.

The classified toner was then surface treated with fumed silica, a hydrophobic silica (Aerosil® R972 manufactured by Nippon Aerosil) by mixing 2000 g of the visible fluorescing magenta dry toner particles with 20 g of the silica to give a dry toner product containing 1.0 weight % silica in a 10 liter Henschel mixer with a 4 element impeller for 2.5 minutes at 3000 RPM. The silica surface-treated visible fluorescing magenta toner particles were sieved through a 300 mesh vibratory sieve to remove non-dispersed silica agglomerates and any toner flakes that may have formed during the surface treatment process.

The covering power of the visible fluorescing magenta (pink) toner particles was measured at 400 cm$^2$/g in the resulting printed enhanced composite color toner images. A two-component dry developer was prepared by combining 100 g of the noted toner particles with 1200 g of carrier particles comprising strontium ferrite cores that had been coated at 230° C. with 0.75 parts of poly(vinylidene fluoride) (Kynar™ 301F manufactured by Pennwalt Corporation) and 0.50 parts of poly(methyl methacrylate) (Soken 1101 distributed by Esprix Chemicals).

The two-component dry developer were then used in the fifth printing station (toner imaging unit) of a NexPress™ 3000 Digital Color Printing Press containing non-fluorescing cyan, non-fluorescing magenta, non-fluorescing yellow, and non-fluorescing black toner particles in the first four printing stations. After application of the various toner particles to paper sheets as the receiver material, and fixing, the covering power for these non-fluorescing color toners was measured at 1650 cm$^2$/g, 1700 cm$^2$/g, 2200 cm$^2$/g, and 1800 cm$^2$/g respectively, in the resulting printed enhanced color toner images.

It was evident that the presence of the visible fluorescing magenta toner particles in the enhanced color toner images provided a "pinkish" effect to the color toner image. This fluorescing effect can be varied by using variations of amounts of fluorescing and non-fluorescing toner particles, visible fluorescing colorant, and other features that are described above.

Fluorescent Toner Example 2

Using visible fluorescing magenta dry toner particles in the fifth printing station, various toner images were printed on a NexPress™ 3000 Digital Color printing press that was equipped with standard non-fluorescing CYMK toners in the first four printing stations. When compared with the standard 4-color image, the addition of the visible fluorescing magenta toner image (fluorescing "pink" hue) provided more warm hue and colorfulness to the human skin tones in the toner images. Color properties of the various skin tones produced with 4 and 5-color process were measured by a Gretag Spectrolino Spectrophotometer and are summarized below in TABLE I. The data show that the 5-color images produced differences in the human skin tones as well as the chroma at the same print density of the human skin tones. In general, the 4-color images had a more blue skin tone hue. When there were no other images available to compare against, the 4-color images appeared acceptable. But when the 4-color image was compared against the 5-color images produced according to the present example, blue hue seen in the human skin tones was objectionable. When these images were shown randomly to several people, all of the observers preferred the warmer hue in the human skin tones that were produced according to the present example.

In TABLE I, L*, a*, and b* parameters are known CIEL*a*b* color scale designations that are known in the art for example from the CEI 1976 standards. In colorimetry or color theory, "chroma" is known as the "colorfulness", color saturation, or perceived intensity of a given color. More details of such property can be found in the book by R. W. G. Hunt, *Measuring Color, 2$^{nd}$* Ed. page 32 (similar details can be found in later editions by the same author).

TABLE I

| Toner Image Colors | Image Density | L* | a* | b* | Chroma |
|---|---|---|---|---|---|
| CYMK | 0.22 | 87.26 | 5.04 | 9.11 | 10.41 |
| CYMK + Visible Fluorescing Magenta | 0.22 | 87.14 | 7.71 | 8.88 | 11.76 |
| CYMK | 0.42 | 78.49 | 10.61 | 18.11 | 20.99 |
| CYMK + Visible Fluorescing Magenta | 0.41 | 78.01 | 14.29 | 16.14 | 21.55 |
| CYMK | 0.60 | 67.51 | 14.74 | 17.55 | 20.86 |
| CYMK + Visible Fluorescing Magenta | 0.61 | 67.46 | 14.99 | 14.5 | 22.92 |
| CYMK | 0.82 | 69.02 | 15.03 | 36.57 | 36.91 |
| CYMK + Visible Fluorescing Magenta | 0.85 | 64.01 | 20.61 | 30.62 | 39.54 |
| CYMK | 1.16 | 56.15 | 49.41 | 41.0 | 64.21 |
| CYMK + Visible Fluorescing Magenta | 1.28 | 58.52 | 53.27 | 50.74 | 73.57 |

It will be appreciated, that other types of fluorescent toner can also be used and that the fluorescent colorants used in such other types of fluorescent toner can have any of a variety of fluorescent colors. For example, U.S. Patent Application Publication 2010/0164218 (Schulze-Hagenest et al.) describes the use of substantially clear (colorless) fluorescent toner particles in printing methods over color toner images for security purposes. Other invisible fluorescent pigments for toner images are described in U.S. Pat. No. 6,664,017 (Patel et al.).

The invention has been described in detail with particular reference to certain preferred embodiments thereof, but it will be understood that variations and modifications can be effected within the scope of the invention.

What is claimed is:

1. A method for determining toner color images, the method comprising:
   obtaining image data and printing instructions for printing the image data;
   determining a pattern of target colors based upon the image data and the printing instructions and a color gamut that can be formed using a predetermined combination of reflective toner colors;
   generating a plurality of reflective toner color images for combination in register to form the pattern of target colors;
   identifying at least one noise evident portion in the pattern of target colors where any unintended density variations will create visual artifacts in the print;
   generating a fluorescent toner color image that when printed using a corresponding fluorescent toner will generate a diffuse fluorescent color light that reduces the extent to which noise induced variations in density in the noise evident portion are observable; and,
   adjusting the plurality of reflective toner color images so that the reflective toner color images combine with the fluorescent color image to form the target color image.

2. The method of claim 1, wherein a hue angle of one of the reflective toner colors and a hue angle of the fluorescent toner color are within about 10 degrees and the adjusting is done by reducing an amount of the reflective toner color of the similar reflective toner color based upon an amount of fluorescent toner color by an amount that is calculated so that the fluorescent toner color image and the reflective toner color image provide a sufficient color contribution at the hue angle for combination with other toner color images in a manner that will form the pattern of target colors.

3. The method of claim 1, a hue angle of the fluorescent toner color is greater than 10 degrees different from a hue angle of any of the reflective toner colors and wherein the adjusting is done by modifying an amount of the reflective toner colors provided in the reflective toner color images so that when the reflective toner color images and the fluorescent toner images are printed and fused, the pattern of target colors is formed.

4. The method of claim 1, wherein the noise evident portion is a portion of the fused toner print having a reflection density that is between about 0.2 and 0.9.

5. The method of claim 1, wherein the noise evident portion is a portion of the fused toner print having a reflection density that is between about 0.4 and 0.7.

6. The method of claim 1, wherein the fluorescent colorants are provided at an upper portion of a fused toner stack on a receiver.

7. The method of claim 6, wherein at least one of the reflective toner color images is and wherein the fluorescent toner color image is determined based upon the presence of the fluorescent colorants at an upper portion of a fused toner stack on receiver.

8. The method of claim 1, wherein the fluorescent colorants are provided at a lower portion of a fused toner mass on a receiver.

9. The method of claim 8, wherein at least one of the reflective toner color images is and wherein the fluorescent toner color image is determined based upon the presence of the fluorescent colorants at non-upper portion of a fused toner stack on receiver.

10. A method operating a toner printer, the method comprising:
    obtaining image data and printing instructions for printing according to the image data;
    determining a pattern of target colors based upon the image data and printing instructions and a color space that can be formed using a predetermined combination of reflective toner colors;
    generating a plurality of reflective toner color images for combination in register to form the pattern of target colors;
    identifying at least one noise evident portion in the pattern of target colors where any unintended density variations will create visual artifacts in the print;
    generating a fluorescent toner color image to emit a diffuse fluorescent color light at the noise evident portion to create a diffuse fluorescent light that softens transitions between areas of different density; and,
    adjusting the plurality of reflective toner color images so that the reflective toner color images combine with the fluorescent color image to form the target color image;
    forming a reflective toner images based upon the reflective toner color images and using a reflective toner that forms a color that corresponds to colors of the each of the reflective toner color images;
    forming a fluorescent toner image based upon the fluorescent toner color image using a fluorescent toner that forms a color that corresponds to the fluorescent toner color,
    transferring the reflective toner images and the fluorescent toner image in registration onto a receiver and
    forming a bond between the toner images and the receiver.

11. The method of claim 10, wherein a hue angle of one of the reflective toner colors and a hue angle of the fluorescent toner color are within about 10 degrees and the adjusting is done by reducing an amount of the reflective toner color of the similar reflective toner color based upon an amount of fluorescent toner color by an amount that is calculated so that the fluorescent toner color image and the reflective toner color image provide a sufficient color contribution at the hue angle for combination with other toner color images in a manner that will form the pattern of target colors.

12. The method of claim 11, wherein a hue angle of the fluorescent toner color is greater than 10 degrees different from a hue angle of any of the reflective toner colors and wherein the adjusting is done by modifying an amount of the reflective toner colors provided in the reflective toner color images so that when the reflective toner color images and the fluorescent toner images are printed and fused, the pattern of target colors is formed.

13. The method of claim 10, wherein the noise evident portion is at an intermediate range density for at least one of the reflective toners.

14. The method of claim 10, wherein the fluorescent colorant is provided at an upper portion of a fused toner stack on a receiver and wherein at least one of the reflective toner color images is determined based upon the anticipated presence of the fluorescent toner at an upper portion of the fused toner stack.

15. The method of claim 10, wherein the fluorescent colorant is provided at a non-upper portion of a fused toner mass on a receiver and wherein the fluorescent toner color image is determined based upon the presence of the fluorescent colorants at the non-upper portion.

* * * * *